(12) United States Patent
Agrawal et al.

(10) Patent No.: US 10,853,075 B2
(45) Date of Patent: Dec. 1, 2020

(54) CONTROLLING ACCESSES TO A BRANCH PREDICTION UNIT FOR SEQUENCES OF FETCH GROUPS

(71) Applicant: Advanced Micro Devices, Inc., Santa Clara, CA (US)

(72) Inventors: Varun Agrawal, Acton, MA (US); John Kalamatianos, Arlington, MA (US); Adithya Yalavarti, Acton, MA (US); Jingjie Qian, Arlington, MA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 16/725,203

(22) Filed: Dec. 23, 2019

(65) Prior Publication Data

US 2020/0150966 A1    May 14, 2020

Related U.S. Application Data

(63) Continuation-in-part of application No. 16/127,093, filed on Sep. 10, 2018.

(51) Int. Cl.
*G06F 9/30* (2018.01)
*G06F 9/38* (2018.01)

(52) U.S. Cl.
CPC .......... *G06F 9/3804* (2013.01); *G06F 9/3808* (2013.01)

(58) Field of Classification Search
None
See application file for complete search history.

(56) References Cited

U.S. PATENT DOCUMENTS 6,332,190 B1 * 12/2001 Hara ..................... G06F 9/3806
711/100
7,779,232 B2 * 8/2010 Doing ................... G06F 9/3804
712/207

(Continued)

OTHER PUBLICATIONS

T. Sherwood and B. Calder, Loop Termination Prediction, 3rd International Symposium on High Performance Computing (ISHPC2K), Oct. 2000.

(Continued)

*Primary Examiner* — Cheng Yuan Tseng
(74) *Attorney, Agent, or Firm* — Park, Vaughan, Fleming & Dowler LLP

(57) ABSTRACT

An electronic device handles accesses of a branch prediction functional block when executing instructions in program code. The electronic device includes a processor having the branch prediction functional block that provides branch prediction information for control transfer instructions (CTIs) in the program code and a minimum predictor use (MPU) functional block. The MPU functional block determines, based on a record associated with a given fetch group of instructions, that a specified number of subsequent fetch groups of instructions that were previously determined to include no CTIs or conditional CTIs that were not taken are to be fetched for execution in sequence following the given fetch group. The MPU functional block then, when each of the specified number of the subsequent fetch groups is fetched and prepared for execution, prevents corresponding accesses of the branch prediction functional block for acquiring branch prediction information for instructions in that subsequent fetch group.

26 Claims, 11 Drawing Sheets

(56) References Cited

U.S. PATENT DOCUMENTS

| | | | | |
|---|---|---|---|---|
| 7,836,288 B2* | 11/2010 | Nancekievill | ......... | G06F 9/3844 |
| | | | | 712/239 |
| 8,566,569 B2* | 10/2013 | Bonanno | ............... | G06F 9/3848 |
| | | | | 712/240 |
| 9,891,922 B2* | 2/2018 | Bonanno | ............. | G06F 9/30076 |

OTHER PUBLICATIONS

D. Parikh, et al., Power Issues related to Branch Prediction, HPCA Feb. 2002.
D. Parikh et al., Power-aware Branch Prediction: Characterization and Design, IEEE Transactions on Computers, Feb. 2004.
J. Haj-Yihia et al., Fine-Grain Power Breakdown of Modern Out-of-Order Cores and its Implications on Skylake-based Systems, ACM Transactions on Architecture and Code Optimization (TACO), v.13, n.4, Dec. 2016.

* cited by examiner

CONTROLLING ACCESSES TO A BRANCH PREDICTION UNIT FOR SEQUENCES OF FETCH GROUPS

RELATED APPLICATIONS

The instant application is a continuation in part of, and hereby claims priority to, pending U.S. patent application Ser. No. 16/127,093, which was filed on 10 Sep. 2018, and which is incorporated by reference in its entirety herein.

GOVERNMENT RIGHTS

This invention was made with government support under the PathForward Project with Lawrence Livermore National Laboratory (prime contract no. DE-AC52-07NA27344, subcontract no. B620717) awarded by the Department of Energy (DOE). The government has certain rights in this invention.

BACKGROUND

Related Art

Many processors for electronic devices (e.g., microprocessors, etc.) include functional blocks that perform operations for improving the efficiency of executing instructions in program code. For example, some processors include prediction functional blocks that are used to predict paths or flows of instruction execution (i.e., sequences of addresses in memory from which instructions are to be fetched for execution) based on records of one or more prior instances of executing the instructions. One common prediction functional block is a branch prediction functional block, which predicts the resolution of control transfer instructions (CTIs) such as jumps and returns in program code. Branch prediction functional blocks monitor and record the behavior of CTIs as the CTIs are executed, such as the "taken" or "not taken" resolutions of CTIs, the target instructions for taken CTIs, etc. Upon again encountering CTIs while executing program code, the previously recorded behavior of the CTIs is used for predicting the resolutions of present executions of the CTIs. Based on the predicted resolutions, the processor speculatively fetches and prepares instructions for execution along a predicted path after the CTI while the CTI itself is prepared and executed. In contrast to processors that wait to determine resolutions of CTIs before proceeding or speculatively follow fixed selections of paths from CTIs, such processors can speculatively follow paths from CTIs that are more likely to be the paths that are followed when the CTIs are executed, resulting in lower delays and/or less recovery operations.

In some processors, branch prediction functional blocks are automatically accessed for instructions (or groups thereof) early in the process of preparing fetched instructions for execution so that predicted resolutions for any CTIs are available as soon as possible for directing paths of program code execution. Because CTI instructions typically form only a small portion of program code, however, many accesses of the branch prediction functional blocks are for instructions that are not CTIs (or for groups of instructions that do not include CTIs). Given that each access of the branch prediction functional block has an associated cost in terms of electrical power consumed, etc., avoiding needless accesses of the branch prediction functional block is desirable.

BRIEF DESCRIPTION OF THE FIGURES

Throughout the figures and the description, like reference numerals refer to the same figure elements.

DETAILED DESCRIPTION

Figure 1:
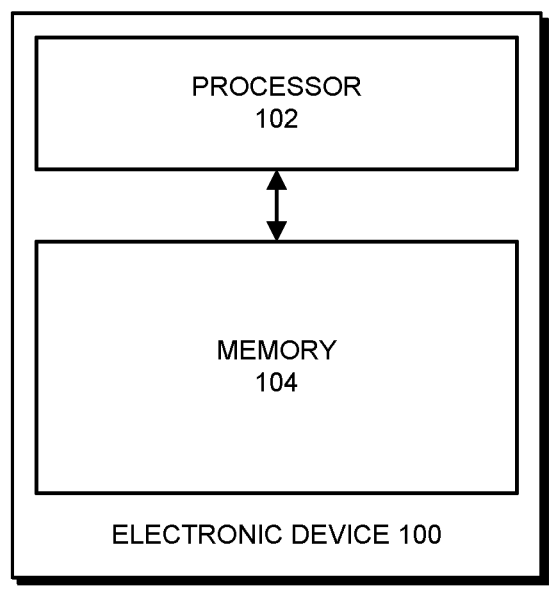
FIG. 1 presents a block diagram illustrating an electronic device in accordance with some embodiments.

The following description is presented to enable any person skilled in the art to make and use the described embodiments and is provided in the context of a particular application and its requirements. Various modifications to the described embodiments will be readily apparent to those skilled in the art, and the general principles defined herein may be applied to other embodiments and applications. Thus, the described embodiments are not limited to the embodiments shown, but are to be accorded the widest scope consistent with the principles and features disclosed herein.

Terminology

In the following description, various terms are used for describing embodiments. The following is a simplified and general description of some of these terms. Note that these terms may have significant additional aspects that are not recited herein for clarity and brevity and thus the description is not intended to limit these terms.

Functional block: functional block refers to a group, collection, and/or set of one or more interrelated circuit elements such as integrated circuit elements/circuitry, discrete circuit elements/circuitry, etc. The circuit elements are "interrelated" in that circuit elements share at least one property. For example, the interrelated circuit elements may be included in, fabricated on, or otherwise coupled to a particular integrated circuit chip, substrate, circuit board, or portion thereof, may be involved in the performance of given functions (computational or processing functions, memory functions, etc.), may be controlled by a common control element and/or a common clock, etc. A functional block can include circuitry having any number of circuit elements, from a single circuit element (e.g., a single integrated circuit logic gate or discrete circuit element) to millions or billions of circuit elements (e.g., an integrated circuit memory).

Control transfer instruction: a control transfer instruction (CTI) is an instruction in program code that, when executed, causes or can cause a jump, displacement, or discontinuity in an otherwise sequential flow of instruction execution. CTIs include "unconditional" CTIs such as jump, call, return, etc., which automatically cause instruction execution to jump from instructions at first memory addresses, the CTI's, to instructions, or "target instructions," at second memory addresses. CTIs also include "conditional" CTIs such as conditional jump instructions, etc., which include, are associated with, or depend on conditions such as greater than, equal to, non-zero, etc. When the corresponding condition is satisfied (e.g., true, false, etc.), a conditional CTI causes a jump in instruction execution from the conditional CTI to an instruction at a second memory address. When the condition is not satisfied, however, instruction execution continues sequentially following the conditional CTI. For example, a conditional branch instruction can be implemented using a condition checking instruction and a conditional CTI (or a single combined instruction), with the branch being "taken," and instruction execution jumping to the target instruction, when the condition is met, and the branch instruction being "not taken" or "falling through," and instruction execution continuing sequentially, when the condition is not met. CTIs include "indirect" unconditional and conditional CTIs, for which addresses of target instructions are specified at runtime. For example, an address of a target instruction of an indirect CTI can be computed and stored in a processor register or other location by a prior instruction, and then used to determine the address to which instruction execution is to jump upon executing the indirect CTI (assuming that the indirect CTI, if it is a conditional indirect CTI, is taken).

Fetch group: fetch groups are blocks or sets of instructions of a specified size that are fetched from one or more memories (e.g., a cache memory, a main memory, etc.) as a group and prepared for execution by a processor. For example, in some embodiments, fetch groups are or include 64 byte blocks of instructions such as 64 byte cache lines. In these embodiments, 64 byte blocks of instructions are fetched from the one or more memories as a group (e.g., in one or more memory read operations) and then the instructions in the fetch group are each prepared for execution by the processor. Depending on fetch group size (in bits or bytes) and instruction size(s), a fetch group can include multiple instructions. For example, a 64 byte fetch group includes 16 four byte instructions.

Overview

The described embodiments include a processor in an electronic device. The processor includes functional blocks such as one or more cache memories, a main memory, and a central processing unit (CPU) core that perform operations for storing copies of instructions in program code (e.g., for operating systems, software applications, firmware, etc.) and executing the instructions in the program code. The processor also includes a minimum predictor use (MPU) functional block that performs operations for avoiding, when possible, accesses of a branch prediction functional block in the processor for acquiring branch prediction information for instructions in fetch groups in program code. In the described embodiments, fetch groups of instructions are fetched from a cache memory or the main memory as a group and prepared for execution by the processor. As a given fetch group is fetched and prepared for execution, the MPU functional block checks a record associated with the given fetch group (should such a record exist) to determine a number of fetch groups to be fetched in sequence following the given fetch group that were previously determined to include no CTIs or to include only conditional CTIs that were not taken. Because there are no CTIs and/or all the CTIs were previously not taken in the number of fetch groups, these fetch groups are predicted to be fetched sequentially during the current execution—and branch prediction information is therefore assumed not to be needed. Thus, as each of the number of fetch groups is subsequently fetched and prepared for execution, the MPU functional block prevents the accesses of the branch prediction functional block that would otherwise be performed for acquiring branch prediction information. For example the MPU functional block may prevent checks in a branch target buffer (BTB), a branch direction predictor, etc. in the branch prediction functional block for acquiring branch prediction information.

In some embodiments, the MPU functional block includes a memory, an "MPU cache," that is used for storing some or all of the above-described records indicating the number of fetch groups having no CTIs or only not taken conditional CTIs that are to be fetched in sequence following respective fetch groups. In these embodiments, the MPU cache includes a number of entries (e.g., 50, 128, etc.), each entry being useable for storing a record associated with a fetch group. For example, in some embodiments, a record can be stored in each entry that includes an identifier for the fetch group (e.g., some or all of an address of a specified instruction in the fetch group), a count of the number of fetch groups to be fetched in sequence following the fetch group, and possibly other metadata and/or information associated with the record. In some embodiments, the MPU cache is organized as a set-associative cache—and therefore each entry is available to be used for storing a single record at a time for a fetch group from among a set of multiple fetch groups (e.g., from among N fetch groups in a range of memory addresses). In these embodiments, a replacement policy such as least-used or least-recently-used is used for selecting entries in the MPU cache for storing the records.

In some embodiments, the MPU functional block dynamically updates or "trains" the MPU cache and thus adds records associated with fetch groups to entries in the MPU cache during operation of the processor. In these embodiments, after fetching and preparing instructions in a given fetch group for execution, the MPU functional block keeps a count of a number of subsequent fetch groups for which all instructions are retired before a taken conditional CTI is retired by the processor. In other words, the MPU functional block counts fetch groups with no CTIs and/or only not taken conditional CTIs that follow the given fetch group in sequence. The MPU functional block then stores, in a selected entry in the MPU cache, a record associated with the given fetch group (again, an identifier of the given fetch group, the count, etc.).

In some embodiments, after initially storing a record associated with a given fetch group to the MPU cache as described above, the MPU functional block monitors subsequent execution and updates the record based on changes in the outcomes of conditional CTIs. In these embodiments, because the outcome of conditional CTIs may change from not taken to taken or vice versa, the number of fetch groups for which all instructions are retired in sequence after the given fetch group before a subsequent taken conditional CTI is retired by the processor may change during the subsequent execution. For example, a conditional CTI that was initially not taken may then be taken during the subsequent execution—such as for a loop in program code that reaches a final iteration, a routine in program code that resolves differently based on different values of variables, etc. As the given fetch group and subsequent fetch groups are re-executed, the MPU functional block keeps a count of a number of fetch groups for which all instructions are retired in sequence before a subsequent taken conditional CTI is retired by the processor. The MPU functional block then updates the existing record in the MPU cache with the count, which involves reducing the count in the existing record when a previously not taken conditional CTI is found to be taken or increasing the count in the existing record when a previously taken conditional CTI is found to be not taken (and thus more of the subsequent fetch groups include only not taken conditional CTIs).

In some embodiments, the MPU functional block stores and uses confidence information to control whether (or not) entries in the MPU cache are used to prevent accesses to the branch prediction functional block for fetch groups. Generally, the confidence information indicates the confidence that the MPU functional block has in an associated record in the MPU cache—and thus the confidence in the count of fetch groups stored in the record. Higher confidence is associated with records for which a sequence of execution has repeated a larger number of times and lower confidence is associated with records for which a sequence of execution has repeated a smaller number of times. In these embodiments, the retirement of instructions in fetch groups is monitored as described above. Each time that a same count of a number of fetch groups for which all instructions are retired in sequence before a subsequent taken conditional CTI is retired by the processor (e.g., during iterations of a loop, calls of a routine in program code, etc.) is found following a given fetch group, the MPU functional block increments a confidence value (e.g., in an M-bit saturating counter) in a record in the MPU cache associated with the given fetch group. On the other hand, each time that a different count of a number of fetch groups for which all instructions are retired in sequence before a subsequent taken conditional CTI is retired by the processor is found following the given fetch group, the MPU functional block decrements the confidence value in the record in the MPU cache associated with the given fetch group (and also updates the count in the record as described above). The MPU functional block then determines, based on the confidence value in the record, whether the count from the record in the MPU cache associated with the given fetch group is to be used to prevent accesses to the branch prediction functional block for subsequent fetch groups. For example, in some embodiments, the MPU functional block compares the confidence value with a threshold value (to determine that the MPU functional block has at least a minimum amount of confidence in the count in the record) and only prevents the accesses of the branch prediction functional block when the confidence value is greater than the threshold value.

In some embodiments, when using the records in the MPU cache to prevent the accesses of the branch prediction functional block as described above, the MPU functional block first fetches a given fetch group in program code, such as by retrieving a cache line from the cache memory. Based on an identifier for the fetch group (e.g., a memory address of a first instruction in the fetch group, etc.), the MPU functional block acquires information from a corresponding record in the MPU cache (such a record is assumed to exist for this example). More specifically, the MPU functional block reads the count of the fetch groups from the corresponding record in the MPU cache—and, in some embodiments, also confirms that a confidence value in the corresponding record is sufficiently high. The MPU functional block then sets a branch access blocking counter equal to the count. As each subsequent fetch group is fetched and prepared for execution, the MPU functional block prevents access to the branch prediction functional block and decrements the branch access blocking counter. When the branch access blocking counter reaches zero, as one or more subsequent fetch groups are fetched and prepared for execution, the MPU functional block permits corresponding accesses of the branch prediction functional block to be performed to acquire branch prediction information for instructions in the one or more subsequent fetch groups. In other words, the MPU functional block uses the branch access blocking counter to prevent accesses of the branch prediction functional block for a specified number of fetch groups, and then commences performing typical accesses of the branch prediction functional block for subsequent fetch groups. In some of these embodiments, the MPU functional block also halts checks of the MPU cache itself as long as the branch access blocking counter is greater than zero. In some embodiments, while the branch prediction functional block is not being accessed, the MPU functional block places some or all of a set of circuit elements and devices in the branch prediction functional block and/or the MPU cache in a reduced power mode (e.g., lowers voltages, decreases clock frequencies, etc.).

In some embodiments, because the MPU functional block prevents accesses of the branch prediction functional block for acquiring branch prediction information as described above, certain CTI activity information that would normally be recorded by the branch prediction functional block is not recorded. For example, a CTI pattern record and/or other CTI history or prediction information may not be updated. In these embodiments, the MPU functional block performs operations for updating CTI activity information when accesses to the branch prediction functional block are prevented to ensure that the CTI activity information is current and correct.

In some embodiments, and differently than the above-described embodiments in which the MPU functional block dynamically updates records in the MPU cache based on the retirement of instructions, the MPU functional block collects and uses information from a front end of a processor for updating the MPU cache. In these embodiments, the front end of the processor fetches and prepares instructions in fetch groups for execution in the processor. As part of this process, a branch prediction functional block in the front end provides taken/not taken predictions for conditional CTI instructions that are used for fetching subsequent fetch groups. In these embodiments, the MPU functional block acquires the predictions from the branch prediction functional block and uses the branch predictions along with information about fetch groups that include no CTIs to keep the counts of subsequent fetch groups with no CTIs and/or one or more not taken conditional CTIs that are executed following the given fetch group.

Because the MPU functional block uses the count of subsequent fetch groups that do not include CTIs or only include not taken conditional CTIs that are to be fetched in sequence following a given fetch group to prevent accesses of the branch prediction functional block, the described embodiments can avoid unnecessary accesses of the branch prediction functional block. This can help to reduce power consumption in the processor and, more generally, in the electronic device. The reduced power consumption can result in the electronic device being less expensive to use, to more efficiently use battery power, etc., which can result in higher user satisfaction with the electronic device.

Electronic Device

FIG. 1 presents a block diagram illustrating electronic device 100 in accordance with some embodiments. As can be seen in FIG. 1, electronic device 100 includes processor 102 and memory 104. Processor 102 and memory 104 are generally implemented in hardware, i.e., using various circuit elements and devices. For example, processor 102 and memory 104 can be entirely fabricated on one or more semiconductor chips, including on one or more separate semiconductor chips, can be fashioned from semiconductor chips in combination with discrete circuit elements, can be fabricated from discrete circuit elements alone, etc. As described herein, processor 102 and memory 104 perform operations for preventing accesses of a branch prediction functional block for fetch groups of instructions in program code.

Processor 102 is a functional block that performs computational and other operations (e.g., control operations, configuration operations, etc.) in electronic device 100. For example, processor 102 can be or include one or more microprocessors, central processing unit (CPU) cores, and/or other processing mechanisms.

Memory 104 is functional block in electronic device 100 that performs operations of a memory (e.g., a "main" memory) for electronic device 100. Memory 104 includes volatile memory circuits such as fourth-generation double data rate synchronous DRAM (DDR4 SDRAM) and/or other types of memory circuits for storing data and instructions for use by functional blocks in electronic device 100 and control circuits for handling accesses of the data and instructions that are stored in the memory circuits and for performing other control or configuration operations.

Electronic device 100 is simplified for illustrative purposes. In some embodiments, however, electronic device 100 includes additional or different functional blocks, subsystems, elements, and/or communication paths. For example, electronic device 100 may include display subsystems, power subsystems, input-output (I/O) subsystems, communication fabrics, etc. Electronic device 100 generally includes sufficient functional blocks to perform the operations herein described.

Electronic device 100 can be, or can be included in, any device that performs the operations described herein. For example, electronic device 100 can be, or can be included in, a desktop computer, a laptop computer, a wearable computing device, a tablet computer, a piece of virtual or augmented reality equipment, a smart phone, an artificial intelligence (AI) or machine learning device, a server, a network appliance, a toy, a piece of audio-visual equipment, a home appliance, a vehicle, etc., and/or combinations thereof.

Processor

Figure 2:
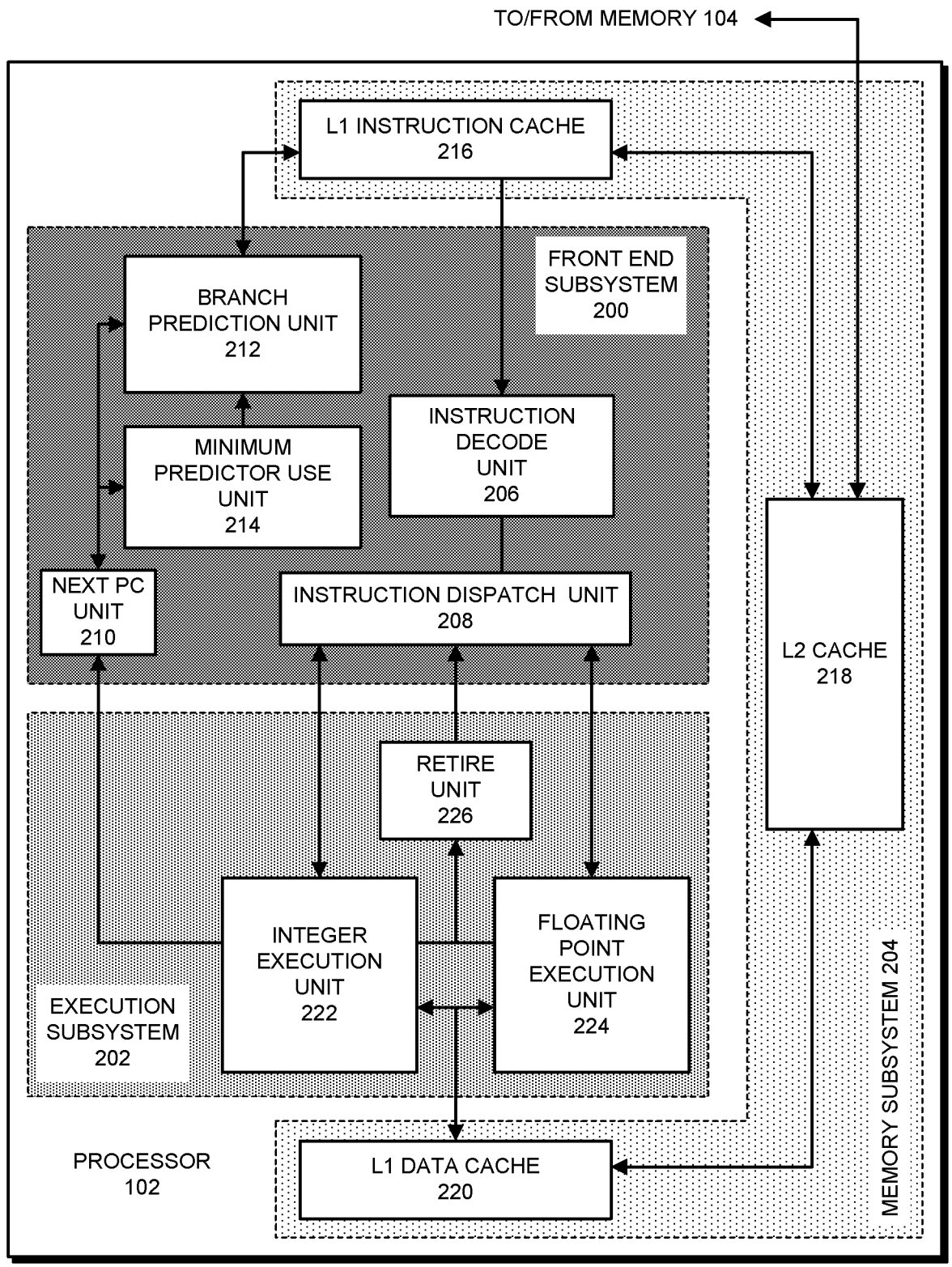
FIG. 2 presents a block diagram illustrating a processor in accordance with some embodiments.

As described above, electronic device 100 includes processor 102, which can be a microprocessor, a CPU core, and/or another processing mechanism or device. FIG. 2 presents a block diagram illustrating processor 102 in accordance with some embodiments. Although certain functional blocks are shown in FIG. 2, in some embodiments, different arrangements, connectivity, numbers, and/or types of functional blocks may be present in processor 102. Generally, processor 102 includes sufficient functional blocks to perform the operations described herein.

As can be seen in FIG. 2, the functional blocks in processor 102 can be considered as part of a front end subsystem 200, an execution subsystem 202, or a memory subsystem 204. Front end subsystem 200 generally includes functional blocks that perform operations for fetching or otherwise acquiring instructions from cache memories or a main memory in, or in communication with, memory subsystem 204 and prepare the instructions for dispatch to execution unit functional blocks in execution subsystem 202.

Front end subsystem 200 includes instruction decode unit 206, which is a functional block that performs operations relating to decoding and preparing fetched instructions for execution. Instruction decode unit 206 fetches or otherwise acquires, from L1 instruction cache 216, L2 cache 218, L3 cache (not shown), or main memory (e.g., memory 104), instructions in N-byte fetch groups (e.g., eight instructions in a 64-byte fetch group, etc.). Instruction decode unit 206 then decodes the instructions in the fetch group into respective micro-operations. Instruction decode unit 206 next sends the micro-operations to instruction dispatch unit 208 to be forwarded to the appropriate execution unit in execution subsystem 202 for execution.

Front end subsystem 200 also includes next PC unit 210, which is a functional block that performs operations for determining a program counter, or address in memory, from which a next fetch group is to be fetched. Next PC unit 210, based on an initial or current value of the program counter, computes a next sequential value for the program counter. For example, given 64-byte fetch groups, next PC unit 210 may compute next address=current address+64 bytes. When taken conditional CTIs do not change program flow, front end subsystem 200 uses the sequential values of the program counter that are computed by next PC unit 210 for fetching fetch groups from corresponding sequential addresses in memory.

Front end subsystem 200 further includes branch prediction unit 212 (interchangeably called the "branch prediction functional block"), which is a functional block that performs operations for predicting the resolutions of CTIs in fetch groups and modifying the program counter and thus the address in memory from which subsequent fetch groups are fetched. In other words, branch prediction unit 212, using one or more records of CTI behavior, predicts a "taken" or "not taken" resolution of CTIs and provides a predicted target address for taken conditional CTIs. When CTIs are predicted taken by branch prediction unit 212, a next or subsequent program counter provided by next PC unit 210 may be replaced using a target address returned by branch prediction unit 212.

Figure 3:
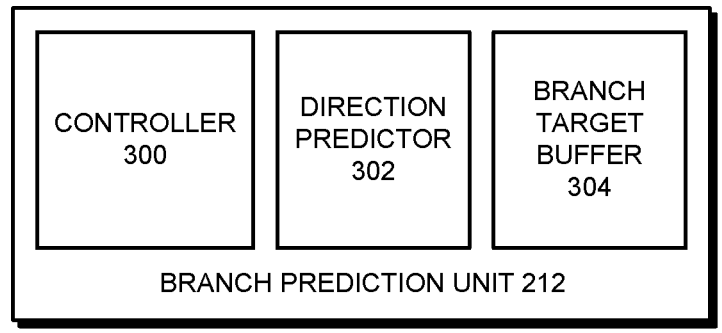
FIG. 3 presents a block diagram illustrating a branch prediction functional block in accordance with some embodiments.

FIG. 3 presents a block diagram illustrating branch prediction unit 212 in accordance with some embodiments. Although branch prediction unit 212 is shown in FIG. 3 with various functional blocks, branch prediction unit 212 is simplified for the purposes of this description; in some embodiments different functional blocks are present in branch prediction unit 212. For example, in some embodiments, multi-level branch prediction, branch pattern predictors, multi-level branch target buffers and/or direction predictors, and/or other branch prediction mechanisms or techniques are used, and corresponding functional blocks are included in branch prediction unit 212. Generally, branch prediction unit 212 includes sufficient functional blocks to perform the operations herein described.

As can be seen in FIG. 3, the functional blocks in branch prediction unit 212 include controller 300, direction predictor 302, and branch target buffer (BTB) 304. Controller 300 includes circuit elements for performing operations of branch prediction unit 212, such as updates of and lookups in direction predictor 302 and branch target buffer 304, communication with other functional blocks, etc. Direction predictor 302 includes a record such as a lookup table, a list, etc. that has a number of entries, each entry useable for storing an address associated with a CTI and an indication of a taken or not taken resolution of the CTI. For example, for a CTI at address A, direction predictor 302 may include an entry that associates address A or a value based thereon with a corresponding prediction (e.g., a saturating counter, etc.) of a taken or not taken resolution of the CTI. Branch target buffer 304 includes a record such as a lookup table, a list, etc., that has a number of entries, each entry useable for storing an address associated with a CTI and an indication of a target address for the CTI. For example, for the CTI at address A, branch target buffer 304 may include an entry that associates address A or a value based thereon with a corresponding absolute or relative address for the target instruction of the CTI. While executing instructions, controller 300, based on actual outcomes of CTI instructions, can store and/or update corresponding entries in direction predictor 302 and/or branch target buffer 304, thereby storing values used in the above-described prediction of CTI instruction resolutions.

Returning to FIG. 2, front end subsystem 200 further includes minimum predictor use unit 214 (interchangeably called the "minimum predictor use functional block"), which is a functional block that performs operations for avoiding, when possible, accesses of a branch prediction functional block for acquiring branch prediction information for instructions in fetch groups. Minimum predictor use unit 214 maintains and uses records associated with fetch groups to determine a number of fetch groups to be fetched in sequence following a given fetch group that were previously determined to include no taken conditional CTIs (i.e., to include no CTIs or only not taken conditional CTIs). As each of the number of fetch groups is subsequently fetched, minimum predictor use unit 214 prevents the accesses of branch prediction unit 212 for acquiring branch prediction information for instructions in that fetch group.

Figure 4:
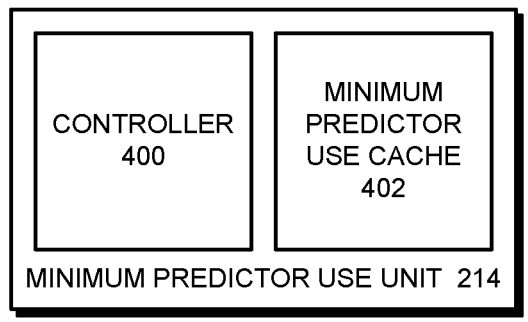
FIG. 4 presents a block diagram illustrating a minimum predictor use functional block in accordance with some embodiments.

FIG. 4 presents a block diagram illustrating minimum predictor use unit 214 in accordance with some embodiments. Although minimum predictor use unit 214 is shown in FIG. 4 with various functional blocks, minimum predictor use unit 214 is simplified for the purposes of this description. In some embodiments, different functional blocks are present in minimum predictor use unit 214. For example, although minimum predictor use unit 214 is shown as including minimum predictor use cache 402, in some embodiments, minimum predictor use unit 214 does not include or use minimum predictor use cache 402. Instead, minimum predictor use unit 214 uses count information stored elsewhere in processor 102, e.g., in entries in branch target buffer 304 and/or another location. Generally, minimum predictor use unit 214 includes sufficient functional blocks to perform the operations herein described.

As can be seen in FIG. 4, the functional blocks in minimum predictor use unit 214 include controller 400 and minimum predictor use cache 402. Controller 400 includes circuit elements for performing operations of the minimum predictor use unit 214, such as updates of and lookups in minimum predictor use cache 402, communication with other functional blocks, preventing accesses of branch prediction unit 212 for instructions in fetch groups, etc. Minimum predictor use cache 402 includes circuit elements such as a memory, memory access, and lookup circuit elements that are arranged as a cache memory having a number of entries (e.g., 50, 128, or another number of entries).

Figure 5:
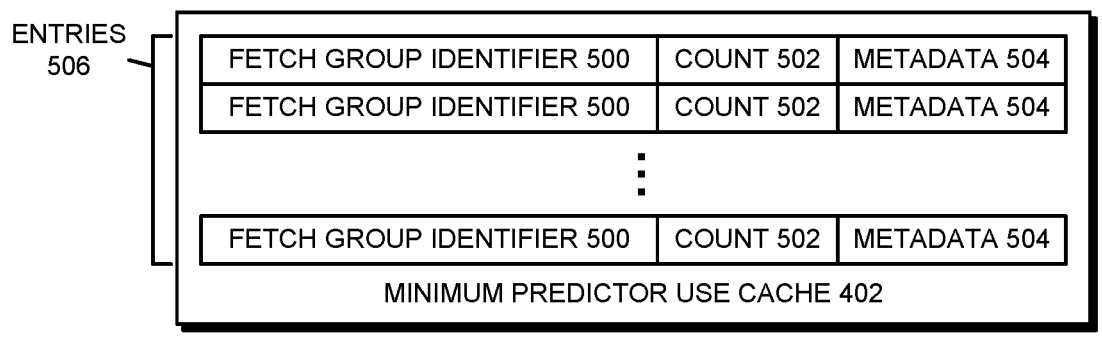
FIG. 5 presents a block diagram illustrating a minimum predictor use cache in accordance with some embodiments.

FIG. 5 presents a block diagram illustrating minimum predictor use cache 402 in accordance with some embodiments. Although minimum predictor use cache 402 is shown with a number of entries that storing specified information, in some embodiments different arrangements of information are stored in entries in minimum predictor use cache 402. Generally, minimum predictor use cache 402 stores sufficient information to perform the operations herein described. As can be seen in FIG. 5, minimum predictor use cache 402 includes a number of entries 506, each entry 506 usable for storing information about a fetch group including fetch group identifier 500, count 502, and metadata 504. Fetch group identifier 500 is used for storing an identifier of a fetch group for which the entry currently stores information. For example, in some embodiments, the identifier is or includes an address of, included in, or otherwise associated with a fetch group for which each entry 506 currently stores information. Count 502 is used for storing a count of fetch groups that were executed in sequence before a taken conditional CTI was encountered following a fetch group for which each entry 506 currently stores information. Metadata 504 is used for storing information about or associated with entry 506 and/or count 502, such as valid bits, permission bits, etc. In some embodiments, metadata 504 includes confidence information that is used to determine whether count 502 is to be used for preventing address to branch prediction unit 212 as described in more detail below.

In some embodiments, minimum predictor use cache 402 includes only a limited number of entries 506 (e.g., 32 entries, 64 entries, etc.) and thus the entries 506 may become filled to capacity during operation of processor 102. When minimum predictor use cache 402 is full, existing information in an entry 506 will need to be overwritten in order for information about another fetch group to be stored in minimum predictor use cache 402. In some embodiments, the entries in minimum predictor use cache 402 are managed by controller 400 using one or more replacement policies, guidelines, etc. In these embodiments, when choosing an entry to be overwritten (i.e., "evicted"), the entry is chosen in accordance with the replacement policies, guidelines, etc. For example, controller 400 may manage information in entries in minimum predictor use cache 402 using a least-recently-used replacement policy. In some embodiments, minimum predictor use cache 402 is set associative (or uses another form of associativity) in order to increase operational performance (e.g., avoid aliasing in minimum predictor use cache 402, etc.).

In some embodiments, upon receiving a program counter, i.e., an address from which a given fetch group is to be fetched, controller 400 in minimum predictor use unit 214 performs a lookup in minimum predictor use cache 402 to determine if an entry that includes the address is present in minimum predictor use cache 402. In other words, the lookup determines if an address of an instruction in given fetch group, e.g., an address of the program counter, of a first instruction of the given fetch group, etc., is to be found in minimum predictor use cache 402. For example, in embodiments where minimum predictor use cache 402 is organized as set associative, controller 400 can use a first portion of the address to determine a set in which the record would be located and a second portion to determine if the record is present in the set. If such a record is present, controller 400 acquires a corresponding count value from count 502 and then uses the count value as the number of fetch groups for preventing accesses of branch prediction unit 212 for instructions in the given fetch group. Otherwise, when no matching address is found in minimum predictor use cache 402, controller 400 does not prevent accesses of branch prediction unit 212, i.e., allows the acquisition of branch prediction information to proceed normally for instructions in the given fetch group.

Note that although minimum predictor use unit 214 is shown as being separate from other functional blocks in FIG. 2, in some embodiments, some or all of minimum predictor use unit 214 can be included in other functional blocks shown in FIG. 2. In these embodiments, operations described herein as being performed by minimum predictor use unit 214 may be performed by circuit elements in other functional blocks. Generally, processor 102 includes various circuit elements used to perform the described operations, without limit as to the particular locations of circuit elements in processor 102 shown in FIG. 2.

Returning to FIG. 2, execution subsystem 202 includes integer execution unit 222 and floating point execution unit 224 (collectively, "execution units"), which are functional blocks that perform operations for executing integer and floating point instructions, respectively. The execution units include elements such as renaming hardware, execution schedulers, arithmetic logic units (ALUs), floating point multiply and add units (in floating point execution unit 224), register files, etc. that are used for executing the respective instructions.

Execution subsystem also includes retire unit 226 (interchangeably called the "retire functional block"), which is a functional block in which the results of executed instructions are held after the corresponding instructions have completed execution, but prior to the results being committed to an architectural state of processor 102 (e.g., written to a cache or memory and made available for use in other operations). In some embodiments, certain instructions can be executed out of program order and retire unit 226 is used in ensuring that results of out-of-order executed instructions are committed in order to the architectural state of the processor properly with respect to results of other out-of-order instructions.

In some embodiments, retire unit 226 performs at least some of the operations for keeping counts of numbers of fetch groups that are fetched for execution in sequence following a given fetch group before a subsequent taken conditional CTI retires. For example, in some embodiments, retire unit 226 keeps counts for every fetch group and reports the counts to minimum predictor use unit 214 upon encountering a respective taken conditional CTI. As another example, in some embodiments, retire unit 226 keeps counts for fetch groups identified by front end subsystem 200 (e.g., via a flag associated with/accompanying specified instructions from fetch groups) and reports counts for these fetch groups to minimum predictor use unit 214.

In some embodiments, counts are not reported by retire unit 226 (and/or are not used by minimum predictor use unit to update any records) unless the counts exceed a corresponding threshold. In other words, in some embodiments, the MPU functional block only stores a record for the given fetch group when the count is higher than a minimum value (e.g., 3, 4, or another value) and skips storing the record for the given fetch group when the count is lower, which can generally help to avoid evicting higher-count records from the MPU cache to make space for lower-count records.

Memory subsystem 204 includes a hierarchy of caches, which are functional blocks that include volatile memory circuits for storing limited numbers of copies of instructions and/or data near the functional blocks that use the instructions and/or data, as well as control circuits for handling operations such as accesses of the data. The hierarchy includes two levels, with level one (L1) instruction cache 216 and L1 data cache 220 on the first level, and L2 cache 218 on the second level. Memory subsystem 204 is communicatively coupled to memory 104 and may be coupled to an external L3 cache (not shown). Memory 104 may be coupled to a non-volatile mass storage device that functions as long-term storage for instructions and/or data (e.g., a disk drive or solid state drive) (not shown).

Figure 6:
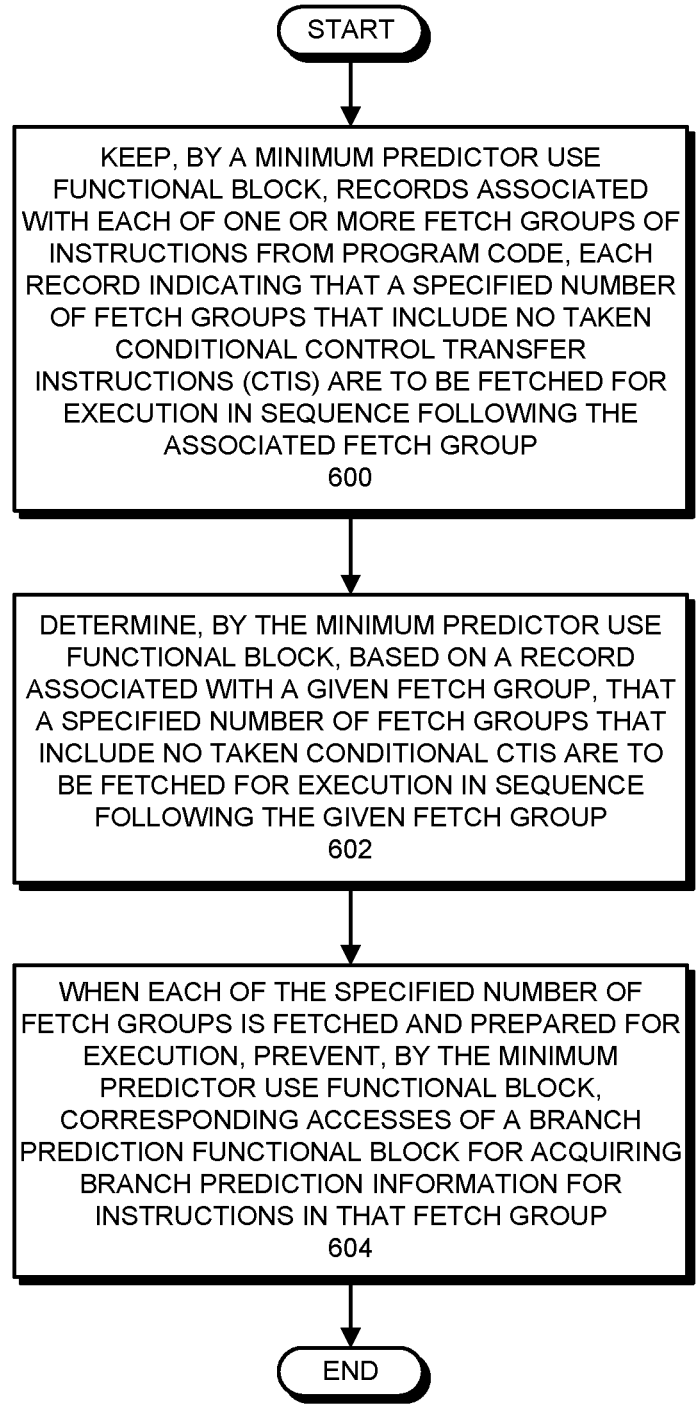
FIG. 6 presents a flowchart illustrating a process for using records associated with fetch groups to prevent accesses of a branch prediction functional block in accordance with some embodiments.

Using Records Associated with Fetch Groups for Preventing Accesses of a Branch Prediction Functional Block In the described embodiments, a processor in an electronic device (e.g., processor 102 in electronic device 100) uses records associated with fetch groups to determine a number of fetch groups that do not include taken conditional CTIs that are to be fetched sequentially following the fetch groups. The processor then prevents, for the number of fetch groups, accesses of a branch prediction functional block to acquire branch prediction information for the individual instructions in the fetch groups. For example the processor may prevent checks in a branch target buffer (BTB), a branch direction predictor, and/or another functional block within the branch prediction functional block for acquiring branch prediction information. FIG. 6 presents a flowchart illustrating a process for using records associated with fetch groups to prevent accesses of a branch prediction functional block in accordance with some embodiments. Note that the operations shown in FIG. 6 are presented as a general example of operations performed by some embodiments. The operations performed by other embodiments include different operations and/or operations that are performed in a different order.

For the example in FIG. 6—and for the described embodiments generally—operations are performed using a count from a record associated with a fetch group that was generated based on one or more previous executions of the fetch group and subsequent fetch groups. Due to the nature of conditional CTIs, it is possible that a current execution will differ from the previous execution. For example, for a loop in program code, the previous executions may have been internal iterations of a loop in program code, while the current execution is a final iteration of the loop—and thus a conditional CTI controlling loop behavior will resolve differently during the current execution due to the loop termination. In the described embodiments, therefore, the use of the counts from the records associated with fetch groups is speculative, i.e., amounts to a prediction that the current execution will match the previous executions. If and when current execution differs from the previous executions, i.e., the resolution of one or more conditional CTIs in subsequent fetch groups changes from not taken to taken or vice versa, although the count will be incorrect, the processor will continue to operate properly—although the processor may perform a CTI misprediction recovery operation. In other words, although the processor, using the count, proceeds sequentially in program code based on the assumption that previously not taken conditional CTIs will continue to be not taken, when a previously not taken conditional CTI turns out to be taken, the processor simply performs the misprediction recovery operation to enable the processor to proceed on the correct path of program code execution. For example, for the misprediction recovery operation, the processor may flush improper instructions from the execution subsystem (i.e., instructions not on the taken path from the CTI) and resume execution from a proper target of the taken conditional CTI.

The operations shown in FIG. 6 start when a processor keeps records associated with each of one or more fetch groups of instructions from program code, each record indicating that a specified number of fetch groups that include no taken conditional CTIs are to be fetched for execution in sequence following the associated fetch group (step 600). In other words, each record includes a count of subsequent fetch groups following a respective fetch group that were determined during at least one previous execution of the respective fetch group and the subsequent fetch groups to include no CTIs or include only not taken conditional CTIs. Based on the previous execution, therefore, the count indicates a number of fetch groups that are to be fetched from a sequence of neighboring addresses in memory. For example, when the fetch groups are 64 byte cache lines, the count indicates a number of cache lines at 64 byte increments to be fetched in sequence—from address A, then A+64 bytes, then A+128 bytes, etc.

Figure 7:
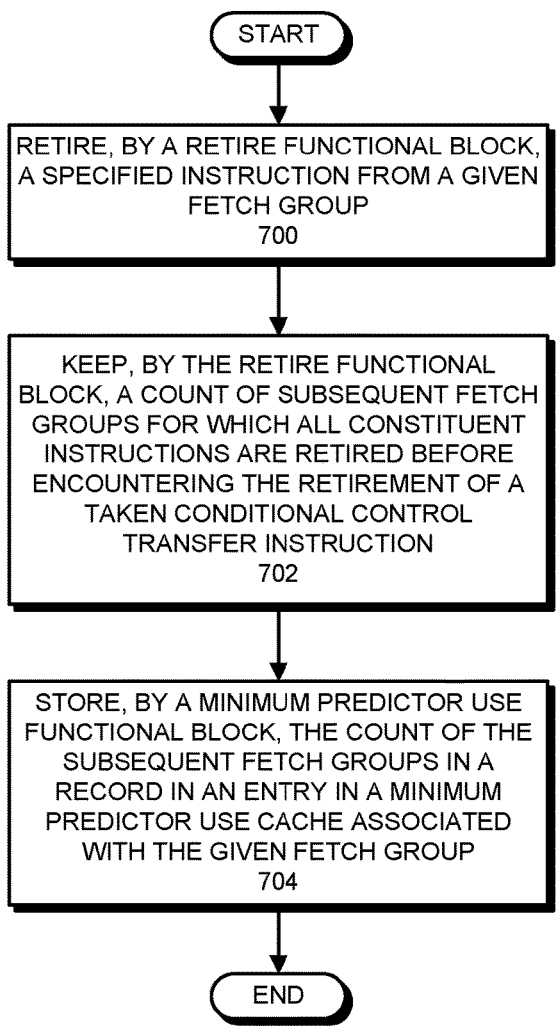
FIG. 7 presents a flowchart illustrating a process for keeping records associated with fetch groups based on the retirement of instructions in fetch groups in accordance with some embodiments.
Figure 8:
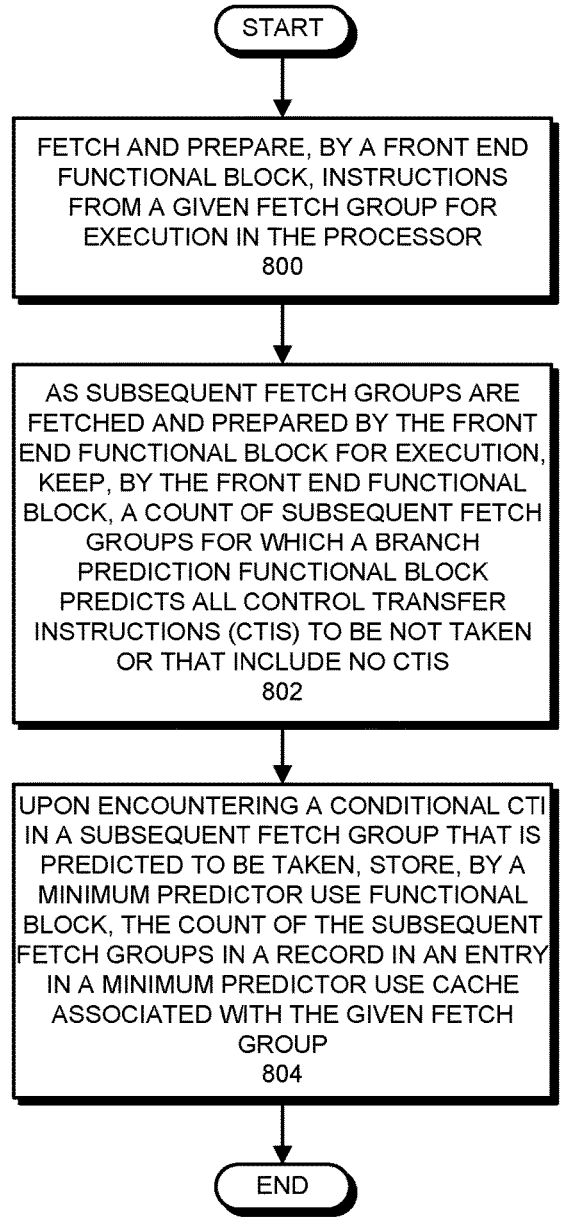
FIG. 8 presents a flowchart illustrating a process for keeping records associated with fetch groups based on information received from a branch prediction functional block in accordance with some embodiments.

FIGS. 7-8 present flowcharts illustrating two processes for keeping records associated with the one or more fetch groups as described for step 600 of FIG. 6 in accordance with some embodiments. FIG. 7 presents a flowchart illustrating a process for keeping records associated with fetch groups based on the retirement of instructions in the fetch groups in accordance with some embodiments. The embodiment shown in FIG. 7, in which the retirement of instructions is used for determining counts for records for fetch groups, is used as an example of how counts are kept in much of this description. FIG. 8 presents a flowchart illustrating a process for keeping records associated with fetch groups based on information received from a branch prediction functional block in accordance with some embodiments. The embodiment shown in FIG. 8, in which the branch prediction functional block provides information for determining counts for records for fetch groups, is an additional embodiment that can be used alone or in combination with the embodiment shown in FIG. 7. Note that the operations shown in FIGS. 7-8 are presented as general examples of operations performed by some embodiments. The operations performed by other embodiments include different operations, operations that are performed in a different order, and/or operations that are performed by different functional blocks.

As can be seen in FIG. 7, the process starts when a specified instruction from a fetch group is retired by a retire functional block in a processor (e.g., retire unit 226 in processor 102) (step 700). Generally, during this operation, the retire functional block determines, based on the retirement of a specified instruction, that subsequent fetch groups are to be counted. For example, the retire functional block may start the count based on the retirement of the first instruction in a fetch group, the last instruction in a fetch group, an instruction in the fetch group that has been marked via a flag or other indicator by the front end of the processor, etc. Recall that retiring an instruction involves committing the instruction to the architectural state of the processor after the instruction has completed execution and when, e.g., in view of other retiring instructions in program order, it is correct and permissible to commit result(s) of and change(s) caused by the instruction to the architectural state of the processor.

The retire functional block then keeps a count of subsequent fetch groups for which all of the constituent instructions are retired before encountering the retirement of a taken conditional CTI (step 702). For this operation, the retire functional block can keep a count of the fetch groups itself or can communicate indications of the retirement of instructions in fetch groups to another entity (e.g., a minimum predictor use (MPU) functional block such as minimum predictor use unit 214) and that entity can keep the actual count. For example, assuming an embodiment in which fetch groups include eight instructions and the retire functional block keeps the count itself, when the retire functional block detects 58 retired instructions following a given fetch group before the next taken conditional CTI retires, the retire functional block can count 7 fetch groups—which is 58/8 rounded down to the nearest integer to represent the number of fetch groups.

The retire functional block then communicates the count (or information for determining the count) to the MPU functional block. The MPU functional block stores the count of the subsequent fetch groups in a record in a minimum predictor use cache (e.g., minimum predictor use cache 402) associated with the given fetch group (step 704). For this operation, the MPU functional block selects an entry in the MPU cache where the record is to be stored and then stores, as at least part of the record, an identifier for the fetch group and the count into the selected entry in the MPU cache. Selecting the entry generally involves choosing an available and permissible entry in the MPU cache for storing the record. For example, in some embodiments, the MPU cache is organized as a set associative cache, and so selecting the entry in the MPU cache involves choosing an entry in the proper set based at least in part on the identifier for the fetch group. In some cases, selecting an entry involves evicting an existing record from an entry in the MPU cache in accordance with a replacement policy or rules to free up the entry for storing the count (or, more simply, overwriting the existing record in the MPU cache). In some embodiments, storing the identifier involves generating the identifier (e.g., some or all of the bits of a memory address of or associated with the fetch group, an assigned identifier for the fetch group, etc.) and storing the identifier into bits or bytes of the selected entry in the MPU cache that are reserved for storing the identifier. In some embodiments, storing the count involves storing the count into bits or bytes of the selected entry in the MPU cache that are reserved for storing the count.

Turning now to FIG. 8, the process in FIG. 8 starts when a front end functional block in a processor (e.g., front end subsystem 200 in processor 102) fetches and prepares instructions from a given fetch group for execution in the processor (step 800). For example, in some embodiments, the front end functional block retrieves, as the fetch group, a cache line from a cache memory (e.g., L1 instruction cache 216). For preparing the instructions in the fetch group for execution, the front end functional block, among other operations, decodes the instructions from the cache line (e.g., in instruction decode unit 206) and dispatches the instructions (e.g., from instruction dispatch unit 208) to the execution subsystem for execution therein. The front end functional block also computes a next PC (e.g., next PC unit 210) from where a next fetch group is to be fetched, which involves acquiring and using a prediction from a branch prediction functional block (e.g., branch prediction unit 212) when such a prediction exists for the given fetch group.

As subsequent fetch groups are fetched and prepared by the front end functional block for execution, the front end functional block keeps a count of subsequent fetch groups for which a branch prediction functional block predicts all CTIs to be not taken or that include no CTIs (step 802). For this operation, the front end functional block requests, from the branch prediction functional block predictions of the resolutions of CTIs for each fetch group. The front end then determines whether the branch prediction functional block predicts a taken resolution for any conditional CTI (if any are to be found) in each fetch group. As long as all conditional CTIs in a fetch group are not taken—or there are no CTIs in the fetch group—the front end functional block increments the count. In this way, based on predictions from the branch prediction functional block (and not retired instructions, as in the embodiments shown in FIG. 7), the front end functional block keeps the count of the subsequent fetch groups. For this operation, the front end can keep a count of the fetch groups itself or can communicate indications of the predictions of no taken conditional CTIs in fetch groups to another entity (e.g., the MPU functional block) and that entity can keep the actual count.

Upon encountering a conditional CTI in a subsequent fetch group for which the branch prediction functional block predicts a taken resolution, the front end functional block communicates the count (or information for determining the count) to the MPU functional block. The MPU functional block then stores the count of the subsequent fetch groups in a record in a minimum predictor use cache (e.g., minimum predictor use cache 402) associated with the given fetch group (step 804). For this operation, the MPU functional block selects an entry in the MPU cache where the record is to be stored and then stores, as at least part of the record, an identifier for the fetch group and the count into the selected entry in the MPU cache. Selecting the entry generally involves choosing an available and permissible entry in the MPU cache for storing the record such as described above for FIG. 7. In some embodiments, storing the identifier involves generating the identifier (e.g., some or all of the bits of a memory address of or associated with the fetch group, an assigned identifier for the fetch group, etc.) and storing the identifier into bits or bytes of the selected entry in the MPU cache that are reserved for storing the identifier. In some embodiments, storing the count involves storing the count into bits or bytes of the selected entry in the MPU cache that are reserved for storing the count.

Figure 9:
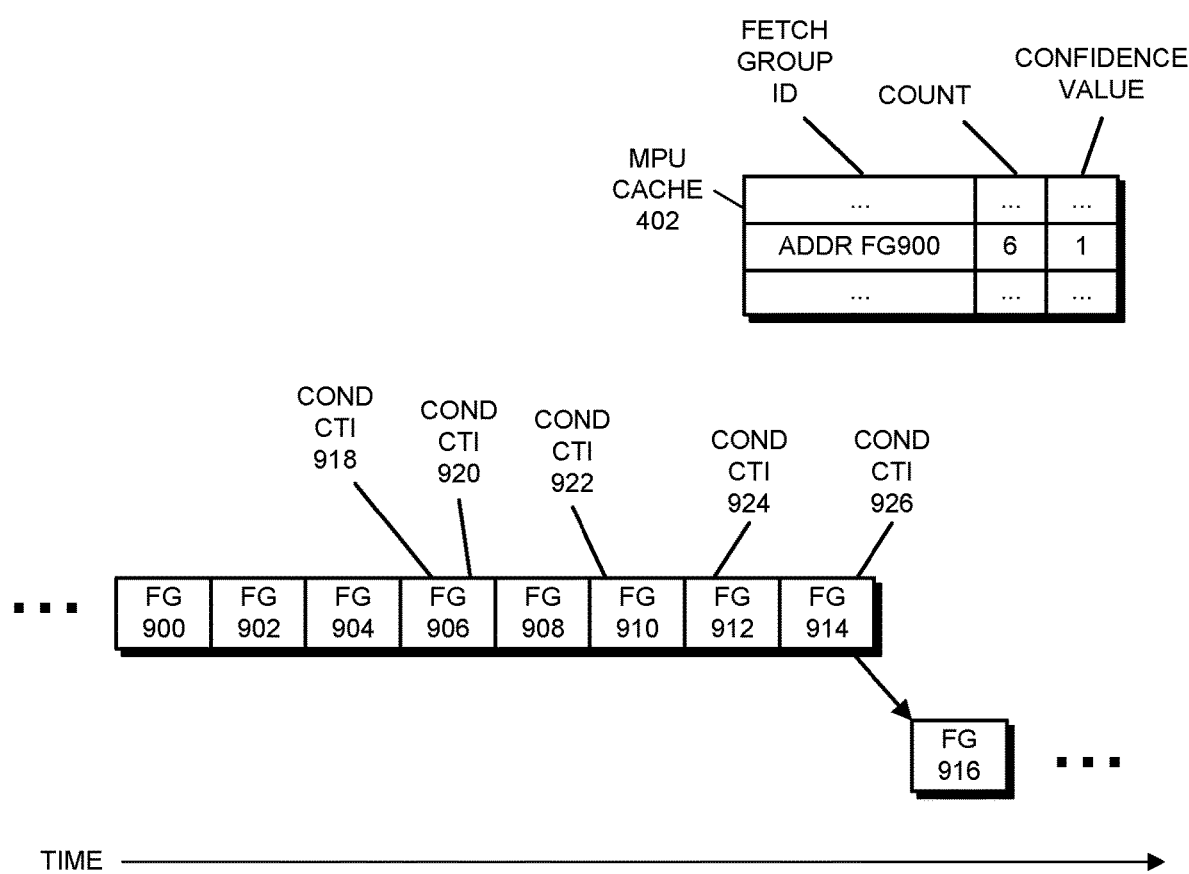
FIG. 9 presents a timeline diagram of operations for adding a record with a count of subsequent fetch groups to a minimum predictor use cache in accordance with some embodiments.

FIG. 9 presents a timeline diagram of operations for adding a record with a count of subsequent fetch groups to an entry in an MPU cache in accordance with some embodiments. In FIG. 9, time proceeds from left to right, and during the time a number of fetch groups (FG900-916) that each include separate sets of instructions from program code are fetched, prepared for execution (e.g., decoded, dispatched, etc.), executed, and retired. Each fetch group includes a number of individual instructions (e.g., four, six, etc.). Note that the operations shown in FIG. 9 are presented as a general example of operations performed by some embodiments. The operations performed by other embodiments include different operations, operations that are performed in a different order, and/or operations that are performed by different functional blocks. For example, the operations in FIG. 9 are performed as instructions in fetch groups retire as shown in FIG. 7, but some embodiments use predictions from a branch prediction functional block for adding records to the MPU cache as shown in FIG. 8.

For the example in FIG. 9, a count of subsequent fetch groups with no taken conditional CTIs is generated for the first fetch group in FIG. 9, i.e., for fetch group 900. In other words, a record associated with fetch group 900 is generated and stored in the MPU cache. For generating the record, as subsequent fetch groups 902-914 are retired, the retire unit (and/or another entity) keeps a count of the subsequent fetch groups for which all constituent instructions are retired before a taken conditional CTI is encountered. Fetch groups 902-904 include no CTIs. As each of fetch groups 902-904 is retired (i.e., when all the constituent instructions have retired), the retire functional block increments the count, so that the count is equal to two. Fetch group 906 includes two conditional (COND) CTIs 918-920, but neither is taken. As fetch group 906 retires, the retire functional block increments the count, so that the count is equal to three. Fetch group 908 includes no CTIs. As fetch group 908 is retired, the retire functional block increments the count, so that the count is equal to four. Each of fetch groups 910-912 include a conditional (COND) CTI 922-924, respectively, but neither of the conditional CTIs is taken. As each of fetch groups 910-912 retires, the retire functional block increments the count, so that the count is equal to six.

In contrast to the conditional CTIs in the earlier fetch groups, conditional (COND) CTI 926 in fetch group 914 is taken. Fetch group 916, which follows fetch group 914, is therefore fetched for execution from a target memory address of conditional CTI 926 (which is assumed to be non-sequential with fetch group 914, as shown by the arrow in FIG. 9). Because conditional CTI 926 in fetch group 914 is taken, the retire unit stops counting the subsequent fetch groups for fetch group 900 and communicates the current count to the MPU functional block. The MPU functional block stores a corresponding record in a selected entry in MPU cache 402. After the MPU functional block stores the record in the entry in MPU cache 402, the entry in MPU cache 402 holds an identifier for the fetch group, which is shown in FIG. 9 as including some or all of an address of fetch group 900 (ADDR FG900), and the count, which is six.

Along with the identifier for the fetch group and the count, the MPU functional block stores, in the record in the entry in MPU cache, a confidence value of 1. Generally, the confidence value indicates the confidence that the MPU functional block has an associated record in the MPU cache—and thus the confidence in the count of fetch groups stored in the record. Higher confidence is associated with records for which a sequence of execution has repeated a larger number of times and lower confidence is associated with records for which a sequence of execution has repeated a smaller number of times. In other words, when fetch groups 900-916 are executed in the same way later on, i.e., with all of conditional CTIs 918-926 resolving in the same way, the confidence value is increased. On the other hand, when fetch groups 900-916 are executed differently later on, i.e., with at least one of the conditional CTIs resolving differently, the confidence value is decreased. The confidence value of 1 in the entry in the MPU cache is an initial value and is thus lower. In some embodiments, the MPU functional block does not use counts with lower confidence values for preventing accesses of the branch prediction functional block for instructions in fetch groups—and may only use counts from records with confidence values above a threshold value such as 4, 5, or another threshold value.

Although not shown in the examples in FIGS. 6-9, in some embodiments, the MPU functional block uses a threshold for the count to determine whether a record that includes the count is to be stored in the MPU cache. In these embodiments, when the count is lower than a threshold, the MPU functional block does not store the record with the count in the MPU cache—and simply discards the count. In other words, the MPU functional block compares the count to the threshold (e.g., 3, 4, or another value) and does not store the record in the MPU cache when the count is lower than the threshold. In this way, records with lower count values are not used to overwrite/evict records with higher count values in the MPU cache—which can help to avoid more rapid turnover of records in the MPU cache and/or the storage of larger proportions of low count records in the MPU cache.

Returning to FIG. 6, while fetching and preparing a given fetch group of instructions for execution, the MPU functional block checks the MPU cache for a record associated with the given fetch group. For example, the MPU functional block can use some or all of a memory address associated with the given fetch group and/or other identifier for the given fetch group to perform a lookup in the MPU cache for the record (the record is assumed to exist for this example). The MPU functional block determines, based on the record from the MPU cache associated with the given fetch group, that a specified number of fetch groups that have no taken conditional CTIs are to be fetched in sequence following the given fetch group (step 602). For example, if the given fetch group is fetch group 900 from FIG. 9, the specified number of fetch groups to be fetched in sequence, or the count, from the record in the MPU cache is six—i.e., includes fetch groups 904-914.

As each of the specified number of fetch groups is subsequently fetched and prepared for execution, the MPU functional block prevents corresponding accesses of the branch prediction functional block for acquiring branch prediction information for instructions in that fetch group (step 604). For this operation, the MPU functional block suppresses, skips, or otherwise does not perform an access of the branch prediction functional block for acquiring branch prediction information such as predictions of whether conditional CTIs in the subsequent fetch groups are taken, predictions of target addresses of conditional CTIs, etc. In other words, the MPU functional block prevents communications with the branch prediction functional block for acquiring the branch prediction information. In this way, the MPU functional block avoids the unnecessary consumption of electrical power, communication interconnect bandwidth consumption, etc. of communicating with the branch prediction functional block.

In some embodiments, in addition to preventing accesses of the branch prediction functional block, the MPU functional block avoids performing the check for the count in the MPU cache as each of the specified number of fetch groups is subsequently fetched and prepared for execution. In other words, the MPU functional block would ordinarily check the MPU cache for each of the specified number of fetch groups, but skips or otherwise prevents the checks of the MPU cache, which can help to further conserve electrical power, etc.

Updating Records Associated with Fetch Groups

Figure 10:
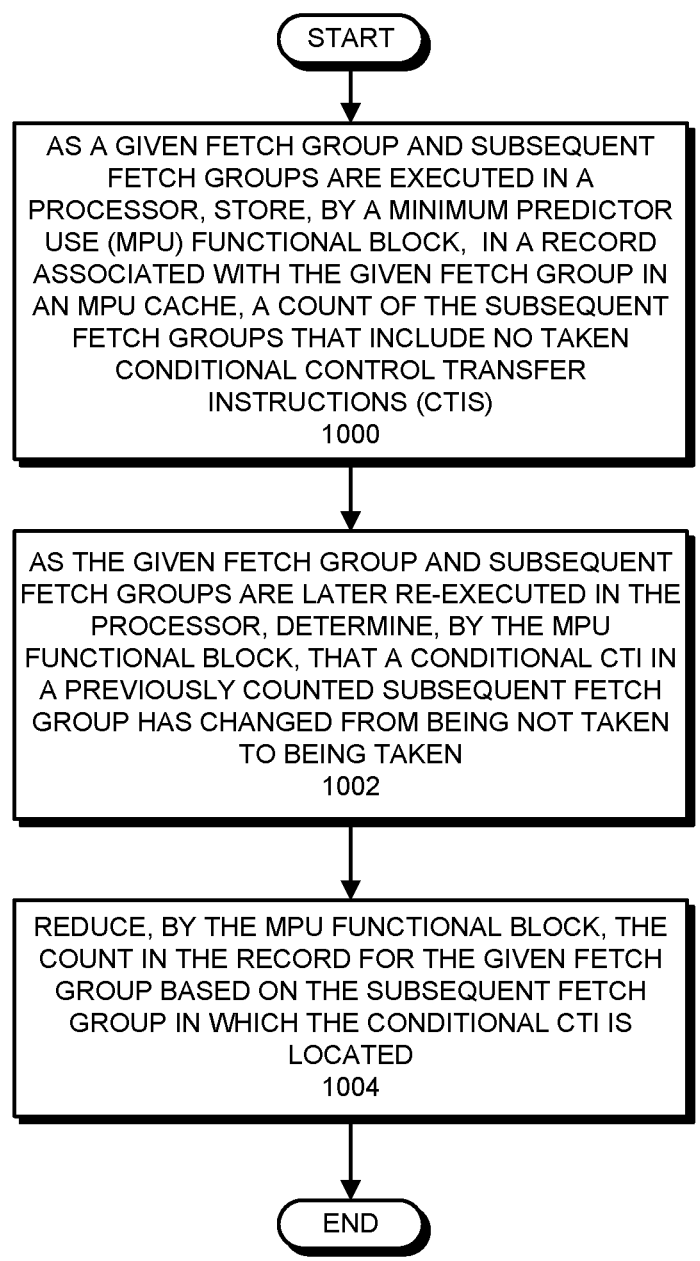
FIG. 10 presents a flowchart illustrating a process for updating a record in a minimum predictor use cache when a conditional control transfer instruction in a previously counted subsequent fetch group changes from not taken to taken in accordance with some embodiments.
Figure 12:
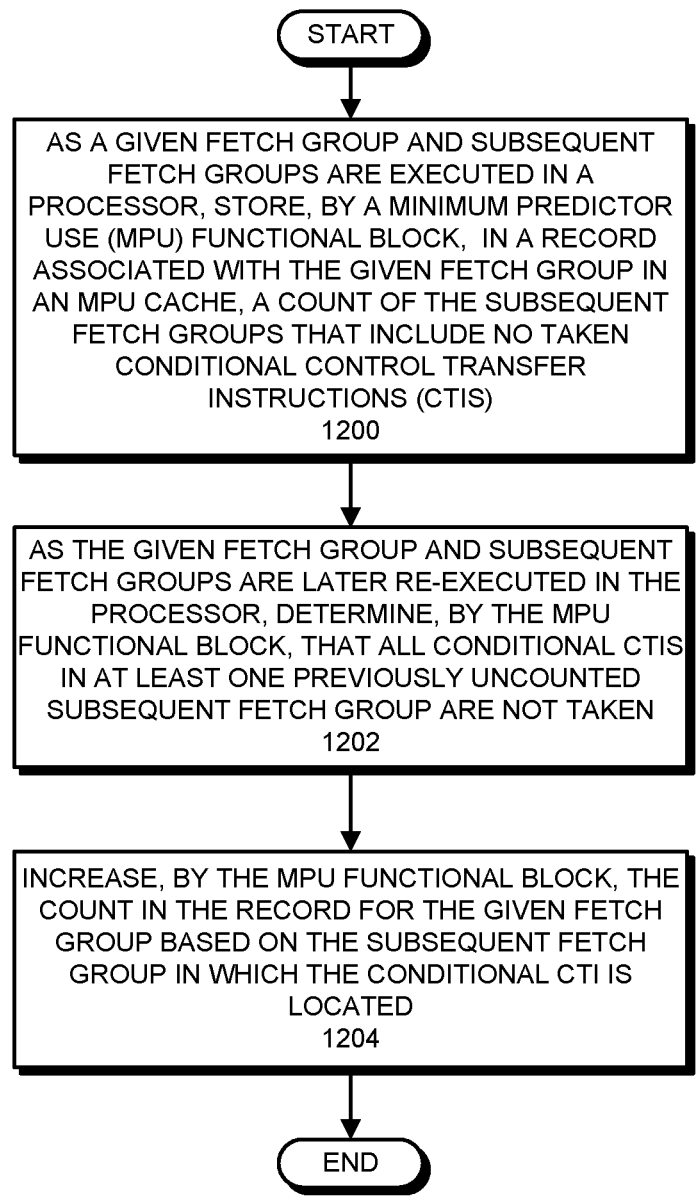
FIG. 12 presents a flowchart illustrating a process for updating a record in a minimum predictor use cache when all conditional control transfer instructions in a previously uncounted subsequent fetch group are not taken in accordance with some embodiments.

In some embodiments, as a processor executes instructions from fetch groups in program code, an MPU functional block in the processor dynamically updates records in an MPU cache associated with fetch groups. In this way, the MPU functional block ensures that each record indicates a current count of the specified number of fetch groups that include no taken conditional CTIs are to be fetched for execution in sequence following the associated fetch group. In some of these embodiments, as part of the updating of the records, the MPU functional block also updates a confidence value in the records in the MPU cache. FIG. 10 presents a flowchart illustrating a process for updating a record in an MPU cache when a conditional CTI in a previously counted subsequent fetch group changes from not taken to taken in accordance with some embodiments. FIG. 12 presents a flowchart illustrating a process for updating a record in an MPU cache when all conditional CTIs in a previously uncounted subsequent fetch group are not taken in accordance with some embodiments. Note that the operations shown in FIGS. 10 and 12 are presented as general examples of operations performed by some embodiments. The operations performed by other embodiments include different operations, operations that are performed in a different order, and/or operations that are performed by different functional blocks.

The process in FIG. 10 starts when the MPU functional block generates a record for a given fetch group by performing operations such as those shown in FIGS. 7 and/or 8. More specifically, as a given fetch group and subsequent fetch groups are executed in a processor, the MPU functional block stores, in a record associated with the given fetch group in an MPU cache, a count of the subsequent fetch groups that include no taken conditional CTIs (step 1000). As the given fetch group and subsequent fetch groups are later re-executed in the processor (i.e., as that section of program code is again executed such as with instances of a loop in program code, calls of a routine in program code, etc.), the MPU functional block determines that a conditional CTI in a previously counted subsequent fetch group has changed from being not taken to being taken (step 1002). The MPU functional block then reduces the count in the record for the given fetch group based on the subsequent fetch group in which the conditional CTI is located (step 1004). In some embodiments, the MPU functional block also reduces the confidence value in the record for the given fetch group in the MPU cache. Reducing the count and the confidence value based on the subsequent fetch group in which the conditional CTI is located are shown in FIG. 11.

Figure 11:
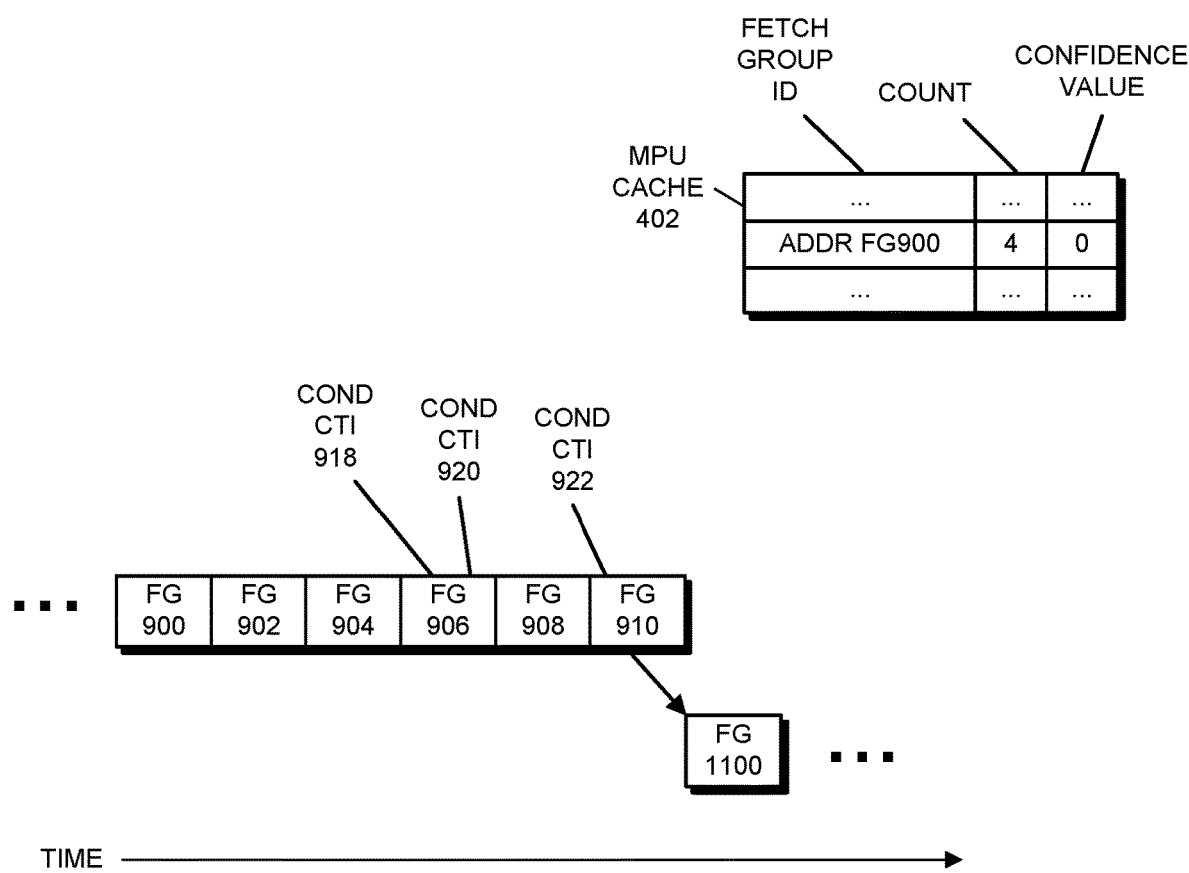
FIG. 11 presents a timeline diagram of operations for updating a record in a minimum predictor use cache when a conditional control transfer instruction in a previously counted subsequent fetch group changes from not taken to taken in accordance with some embodiments.

FIG. 11 presents a timeline diagram of operations for updating a record in an MPU cache when a conditional CTI in a previously counted subsequent fetch group changes from not taken to taken in accordance with some embodiments. The timeline diagram illustrates operations similar to those shown in the process shown in FIG. 10 and follows the operations shown in FIG. 9. In FIG. 11, time proceeds from left to right, and during the time a number of fetch groups (FG900-910 and FG1100) that each include separate sets of instructions from program code are fetched, prepared for execution (e.g., decoded, dispatched, etc.), executed, and retired. Each fetch group includes a number of individual instructions (e.g., four, six, etc.). Note that the operations shown in FIG. 11 are presented as a general example of operations performed by some embodiments. The operations performed by other embodiments include different operations, operations that are performed in a different order, and/or operations that are performed by different functional blocks. For example, the operations in FIG. 11 are performed as instructions in fetch groups retire as shown in FIG. 7, but some embodiments use predictions from a branch prediction functional block for adding records to the MPU cache as shown in FIG. 8.

For the example in FIG. 11, a count of subsequent fetch groups with no taken conditional CTIs is updated for the first fetch group in FIG. 11, i.e., for fetch group 900 (i.e., the same fetch group for which the record was initially generated in FIG. 9). For updating the record, as subsequent fetch groups 902-910 are retired, the retire unit (and/or another entity) keeps a count of the subsequent fetch groups for which all constituent instructions are retired before a taken conditional CTI is encountered. Fetch groups 902-908 include no CTIs or include only not taken conditional CTIs. As each of fetch groups 902-908 is retired, the retire functional block increments the count, so that the count is equal to four. Unlike in FIG. 9, where conditional CTI 922 is not taken, during the later execution, conditional CTI 922 is taken. Fetch group 1100, which follows fetch group 910, is therefore fetched for execution from a target memory address of conditional CTI 922 (which is assumed to be non-sequential with fetch group 910, as shown by the arrow in FIG. 11). Because conditional CTI 922 in fetch group 910 is taken, the retire unit stops counting the subsequent fetch groups for fetch group 900 and communicates the current count to the MPU functional block. The MPU functional block updates the associated record in MPU cache 402. After the MPU functional block updates the record in the entry in MPU cache 402, the entry in MPU cache 402 holds the updated value for the count, which is four (recall that the count was originally six, as shown in FIG. 9). Along with the count, the MPU functional block decreases the confidence value to a value of 0 in the record in the entry in MPU cache. The MPU functional block decreases the confidence value to zero because the later execution did not match, in terms of the resolutions of conditional CTIs, the initial execution as shown in FIG. 9.

The process in FIG. 12 starts when the MPU functional block generates a record for a given fetch group by performing operations such as those shown in FIGS. 7 and/or 8. More specifically, as a given fetch group and subsequent fetch groups are executed in a processor, the MPU functional block stores, in a record associated with the given fetch group in an MPU cache, a count of the subsequent fetch groups that include no taken conditional CTIs (step 1200). As the given fetch group and subsequent fetch groups are later re-executed in the processor (i.e., as that section of program code is again executed such as with instances of a loop in program code, calls of a routine in program code, etc.), the MPU functional block determines that all conditional CTIs in at least one previously uncounted subsequent fetch group are not taken (step 1202). The MPU functional block then increases the count in the record for the given fetch group based on the subsequent fetch group in which the conditional CTI is located (step 1204). In some embodiments, the MPU functional block also reduces the confidence value in the record for the given fetch group in the MPU cache. Increasing the count and reducing the confidence value based on the subsequent fetch group in which the conditional CTI is located are shown in FIG. 13.

Figure 13:
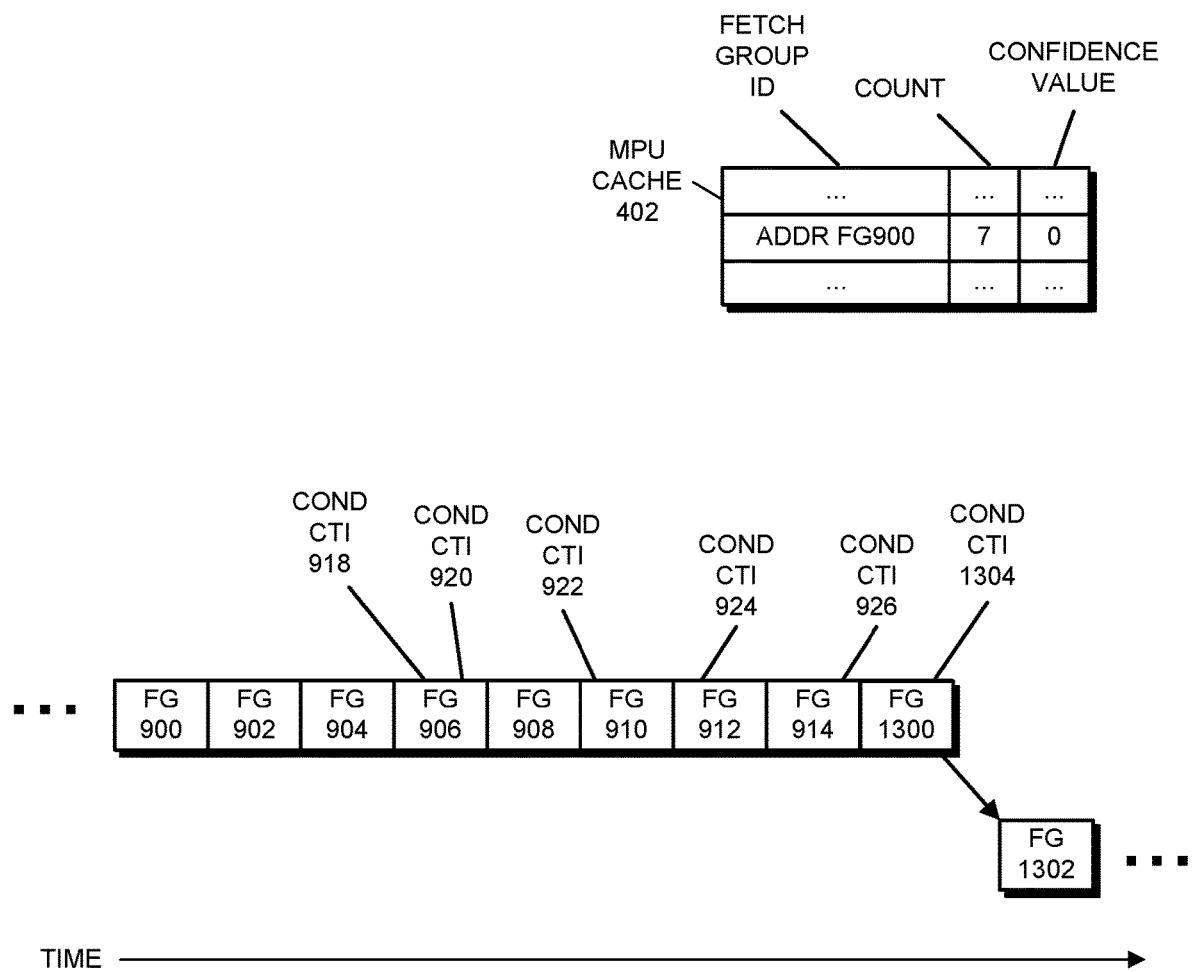
FIG. 13 presents a timeline diagram of operations for updating a record in a minimum predictor use cache when all of the conditional control transfer instructions in a previously uncounted subsequent fetch group are not taken in accordance with some embodiments.

FIG. 13 presents a timeline diagram of operations for updating a record in an MPU cache when all of the conditional CTI in a previously uncounted subsequent fetch group are not taken in accordance with some embodiments. The timeline diagram illustrates operations similar to those shown in the process shown in FIG. 12 and follows the operations shown in FIG. 9. In FIG. 13, time proceeds from left to right, and during the time a number of fetch groups (FG900-914 and FG1300-1302) that each include separate sets of instructions from program code are fetched, prepared for execution (e.g., decoded, dispatched, etc.), executed, and retired. Each fetch group includes a number of individual instructions (e.g., four, six, etc.). Note that the operations shown in FIG. 13 are presented as a general example of operations performed by some embodiments. The operations performed by other embodiments include different operations, operations that are performed in a different order, and/or operations that are performed by different functional blocks. For example, the operations in FIG. 13 are performed as instructions in fetch groups retire as shown in FIG. 7, but some embodiments use predictions from a branch prediction functional block for adding records to the MPU cache as shown in FIG. 8.

For the example in FIG. 13, a count of subsequent fetch groups with no taken conditional CTIs is updated for the first fetch group in FIG. 13, i.e., for fetch group 900 (i.e., the same fetch group for which the record was initially generated in FIG. 9). For updating the record, as subsequent fetch groups 902-912 are retired, the retire unit (and/or another entity) keeps a count of the subsequent fetch groups for which all constituent instructions are retired before a taken conditional CTI is encountered. Fetch groups 902-912 include no CTIs or include only not taken conditional CTIs. As each of fetch groups 902-912 is retired, the retire functional block increments the count, so that the count is equal to six. Unlike in FIG. 9, where conditional CTI 926 is taken, during the later execution, conditional CTI 926 is not taken. As fetch group 914 is retired, the retire functional block increments the count, so that the count is equal to seven (thereby counting fetch group 914, which was not counted in FIG. 9).

In contrast to the conditional CTIs in the earlier fetch groups, conditional (COND) CTI 1304 in fetch group 1300 is taken. Fetch group 1302, which follows fetch group 1300, is therefore fetched for execution from a target memory address of conditional CTI 1304 (which is assumed to be non-sequential with fetch group 1300, as shown by the arrow in FIG. 13). Because conditional CTI 1304 in fetch group 1300 is taken, the retire unit stops counting the subsequent fetch groups for fetch group 900 and communicates the current count to the MPU functional block. The MPU functional block updates the associated record in MPU cache 402. After the MPU functional block updates the record in the entry in MPU cache 402, the entry in MPU cache 402 holds the updated value for the count, which is seven (recall that the count was originally six, as shown in FIG. 9). Along with the count, the MPU functional block decreases the confidence value to a value of 0 in the record in the entry in MPU cache. The MPU functional block decreases the confidence value to zero because the later execution did not match, in terms of the resolutions of conditional CTIs, the initial execution as shown in FIG. 9.

FIGS. 10-13 present examples in which a later execution does not match a previous execution (from FIG. 9) and thus the confidence value is decreased. Although a separate figure is not presented, it is possible that one or more later executions match, in terms of conditional CTI resolutions, the previous execution(s). In this case, the confidence value would be increased. In some embodiments, the confidence value is kept using a saturating counter (e.g., an N-bit saturating counter), and thus confidence values can increase only to a certain value. As described above, in some embodiments, the MPU functional block will not use a count value from a record unless the confidence value is above a threshold value. In other words, when the MPU functional block does not have sufficient confidence in the record to block accesses of the branch prediction functional block based on the count from the record, the MPU functional block will allow accesses of the branch prediction functional block to proceed, despite the existence of a corresponding record in the MPU cache.

Figure 14:
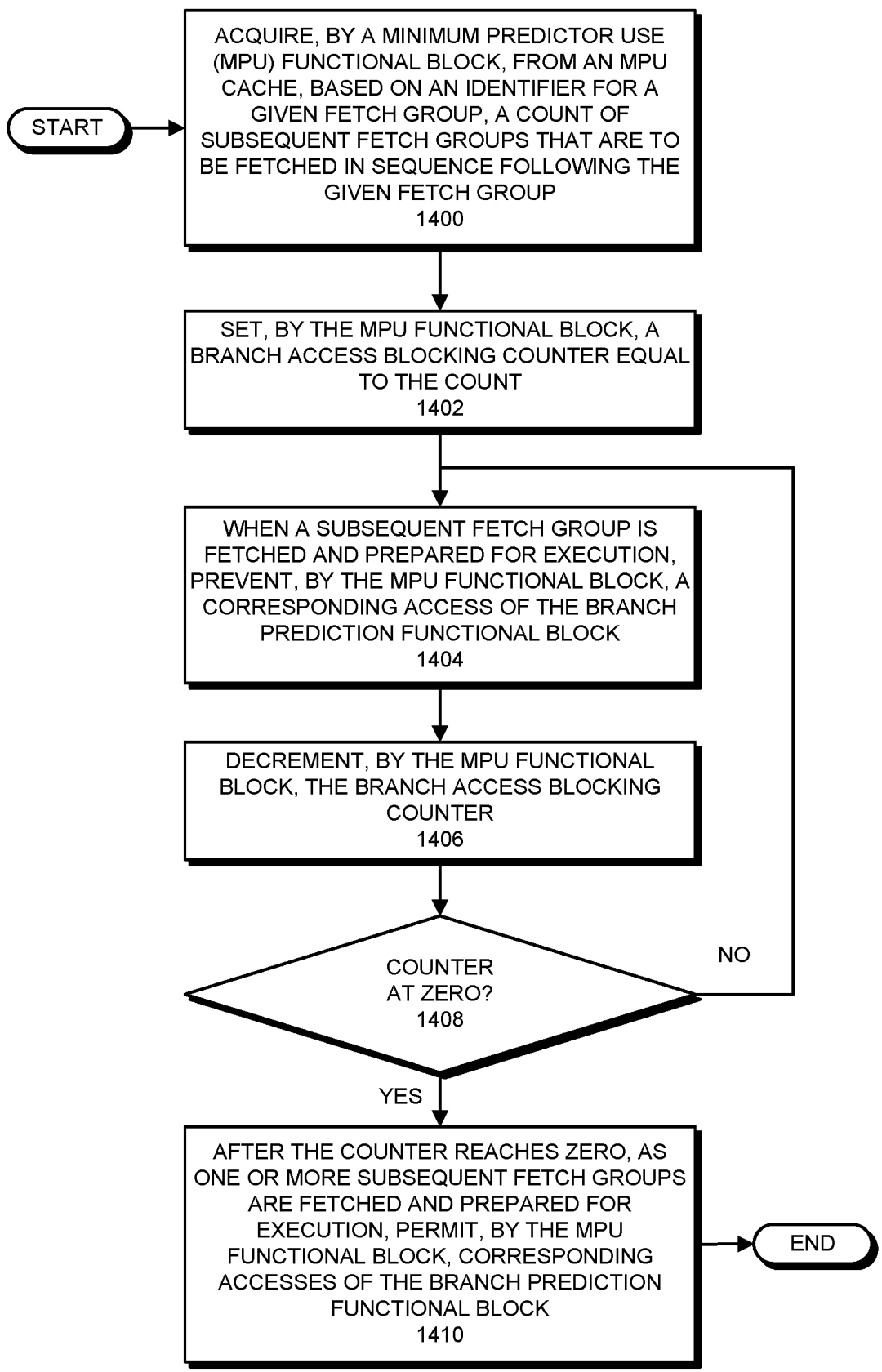
FIG. 14 presents a flowchart illustrating a process for using a count of fetch groups that do not include taken conditional control transfer instructions to be fetched in sequence following a given fetch group for preventing accesses of a branch prediction functional block in accordance with some embodiments.

Using Records Associated with Fetch Groups for Preventing Accesses of a Branch Prediction Functional Block FIG. 14 presents a flowchart illustrating a process for using a count of fetch groups that do not include taken conditional CTIs to be fetched in sequence following a given fetch group for preventing accesses of a branch prediction functional block in accordance with some embodiments. Note that the operations shown in FIG. 14 are presented as a general example of operations performed by some embodiments. The operations performed by other embodiments include different operations, operations that are performed in a different order, and/or operations that are performed by different functional blocks. The operations of FIG. 14 are described in general terms in steps 602-604 of FIG. 6 and thus FIG. 14 provides a more detailed description of some embodiments of steps 602-604.

The operations in FIG. 14 start when an MPU functional block acquires, from an MPU cache, based on an identifier for a given fetch group, a count of subsequent fetch groups that are to be fetched in sequence following the given fetch group (step 1400). For this operation, the MPU functional block compares an identifier for the given fetch group with identifiers in some or all of the entries in the MPU cache to determine whether a corresponding record is present in the MPU cache. For example, the MPU functional block can compare some or all of the bits of an address associated with the given functional block (e.g., a program counter, an address for a particular instruction in the fetch group, etc.) and/or another identifier for the given fetch group with the identifier in some or all of the active/valid entries in the MPU cache. For the example, it is assumed that a match is found and a hit occurs in the MPU cache—and thus the MPU cache includes a record associated with the given fetch group. The MPU functional block therefore reads the count from the matching entry in the MPU cache. Note that, if a match was not to be found in the MPU cache for the given fetch group, the MPU functional block would not prevent accesses of the branch prediction functional block—i.e., would continue typical branch prediction operations.

The MPU functional block then sets a branch access blocking counter equal to the count from the record (step 1402). For example, the MPU functional block can store, in a dedicated branch access blocking counter register or other memory location, the count or a representation thereof.

When a subsequent fetch group is fetched and prepared for execution, the MPU functional block prevents a corresponding access of the branch prediction functional block (step 1404). For example, the MPU functional block can assert one or more control signals to prevent circuit elements in the branch prediction functional block from performing access operations, can prevent address or related values from being sent to the branch prediction functional block, can halt clocks, power down circuit elements, and/or perform other operations to prevent the corresponding access of the branch prediction functional block. For this operation, in some embodiments, each of one or more accesses of the branch prediction functional block such as branch direction or taken/not taken resolution, branch address acquisition, etc. are prevented by preventing respective functional blocks in the branch prediction functional block from performing related operations as described above. In some embodiments, the MPU functional block places the branch prediction functional block or a portion thereof in a reduced power mode when accesses are prevented. For example, the MPU functional block may halt controlling clocks (e.g., via clock gating), reduce voltage and/or electrical power, deassert enable signals, etc. for the branch prediction functional block or the portion thereof.

Although not shown in FIG. 14, in some embodiments, the MPU functional block also prevents accesses of the MPU cache for fetch groups as long as the branch access blocking counter is non-zero. In some of these embodiments, the MPU functional block (or another entity) places the MPU cache in a reduced power mode while the branch access blocking counter is non-zero. For example, the MPU functional block may halt controlling clocks, reduce voltage and/or electrical power, deassert enable signals, and/or otherwise place the MPU cache in a reduced power mode.

The MPU functional block also, when a subsequent fetch group is fetched and prepared for execution, decrements the branch access blocking counter (step 1406). For example, the MPU functional block can reduce the value of the branch access blocking counter in the dedicated counter register or other memory location by one, can transition the branch access blocking counter to a next lower value or representation thereof, etc.

Until the counter reaches zero (step 1408), the MPU functional block continues to prevent accesses of the branch prediction functional block (step 1404) and decrement the branch access blocking counter (step 1406) as fetch groups are fetched and prepared for execution. After the branch access blocking counter reaches zero, i.e., after the last of the count's worth of fetch groups has been fetched and is being prepared for execution, as one or more subsequent fetch groups are fetched and prepared for execution, the MPU functional block permits corresponding accesses of the branch prediction functional block to acquire branch prediction information (step 1410). In other words, when the branch access blocking counter is equal to zero, the MPU functional block permits ordinary branch prediction operations such as branch target and branch direction prediction to be performed. In this way, the MPU functional block blocks branch prediction accesses (and possibly MPU cache accesses) when the branch access blocking counter is non-zero in order to avoid unnecessary accesses of the branch prediction functional block (and possibly the MPU cache), but otherwise allows typical branch prediction operations to occur.

Updating Control Transfer Instruction Activity Information

In some embodiments, a branch prediction functional block (e.g., branch prediction unit 212) is responsible for keeping and using specified CTI activity information. For example, the branch prediction functional block may store CTI resolution (taken/not taken) history records, CTI pattern records, and/or other records of CTI predictions and/or resolutions. As another example, internal functional blocks of the branch prediction functional block, such as a direction predictor and/or a BTB in the branch prediction functional block, may be set, configured, and/or accessed (or not) based on timers for information about CTIs that is stored in entries in the internal functional blocks. When accesses of the branch prediction functional block are prevented as described herein, the branch prediction functional block may not update and/or be able to properly use CTI activity information. In some embodiments, therefore, the MPU functional block performs operations for updating CTI activity information when accesses to the branch prediction functional block are prevented. For example, the MPU functional block may write CTI activity information into memory locations or registers in the branch prediction functional blocks, set or update timer values, and/or otherwise keep CTI activity information current.

Multi-Threaded Processor

In some embodiments, a processor is a multi-threaded processor and thus supports two or more separate threads of instruction execution. Generally, a multi-threaded processor includes functional blocks and/or hardware structures that are dedicated to each separate thread, but can also include functional blocks and/or hardware structures that are shared among the threads and/or which perform respective operations for more than one thread. For example, functional blocks such as the branch prediction functional block and MPU functional block may perform or block branch prediction operations, respectively, for all threads (or some combination of multiple threads). For instance, the MPU cache may be implemented as a single MPU cache that is used for all threads (or some combination of multiple threads). In this case, the records in the single MPU cache are maintained for the respective threads and are used for all of the respective threads—and thus a record associated with a particular fetch group may be prepared/trained as a given thread executes a given fetch group and subsequent fetch groups and then used by other threads for controlling accesses of the branch prediction unit when executing the given fetch group and subsequent fetch groups. Alternatively, MPU caches may be implemented on a per-thread basis, so that each thread has a corresponding separate MPU cache. In these embodiments, the records in each MPU cache are maintained for an associated thread and can be different from the records maintained in the MPU cache(s) for other thread(s). As yet another example, the MPU functional block may prevent accesses of the prediction functional block on a per-thread basis, and thus may maintain a separate and independent branch access blocking counter for each thread that is used as described herein for preventing accesses of the prediction functional block for the corresponding thread.

As described above, in some embodiments, while preventing accesses of a branch prediction functional block for sequentially fetched fetch groups that do not include taken conditional CTIs following a fetch group, the MPU functional block may also prevent accesses of the MPU cache and place the MPU cache in a reduced power mode. In these embodiments, when multiple threads depend on the MPU cache (when one MPU cache is used to hold records for two or more threads), the MPU cache may remain in a full power mode/active to service other threads (and thus will not be transitioned to the reduced power mode). The same holds for the branch prediction functional block; when only a single thread is using the branch prediction functional block, the branch prediction functional block may be placed in a reduced power mode when accesses are being prevented. When the branch prediction functional block is being used by two or more threads, however, the branch prediction functional block may be left in a full power mode/active to service other threads. The particular accesses are not made for specific threads, however, as described herein.

In some embodiments, at least one electronic device (e.g., electronic device 100) uses code and/or data stored on a non-transitory computer-readable storage medium to perform some or all of the operations herein described. More specifically, the at least one electronic device reads code and/or data from the computer-readable storage medium and executes the code and/or uses the data when performing the described operations. A computer-readable storage medium can be any device, medium, or combination thereof that stores code and/or data for use by an electronic device. For example, the computer-readable storage medium can include, but is not limited to, volatile and/or non-volatile memory, including flash memory, random access memory (e.g., eDRAM, RAM, SRAM, DRAM, DDR4 SDRAM, etc.), non-volatile RAM (e.g., phase change memory, ferroelectric random access memory, spin-transfer torque random access memory, magnetoresistive random access memory, etc.), read-only memory (ROM), and/or magnetic or optical storage mediums (e.g., disk drives, magnetic tape, CDs, DVDs, etc.).

In some embodiments, one or more hardware modules perform the operations herein described. For example, the hardware modules can include, but are not limited to, one or more processors/cores/central processing units (CPUs), application-specific integrated circuit (ASIC) chips, neural network processors or accelerators, field-programmable gate arrays (FPGAs), compression and/or encoding subsystems, compute units, embedded processors, graphics processors (GPUs)/graphics cores, accelerated processing units (APUs), functional blocks, controllers, accelerators, and/or other programmable-logic devices. When circuitry (e.g., integrated circuit elements, discrete circuit elements, etc.) in such hardware modules is activated, the circuitry performs some or all of the operations. In some embodiments, the hardware modules include general purpose circuitry such as execution pipelines, compute or processing units, etc. that, upon executing instructions (program code, firmware, etc.), perform the operations. In some embodiments, the hardware modules include purpose-specific or dedicated circuitry that performs the operations, possibly including circuitry that performs some or all of the operations without executing instructions.

In some embodiments, a data structure representative of some or all of the functional blocks and circuit elements described herein (e.g., electronic device 100 or some portion thereof) is stored on a non-transitory computer-readable storage medium that includes a database or other data structure which can be read by an electronic device and used, directly or indirectly, to fabricate hardware including the functional blocks and circuit elements. For example, the data structure may be a behavioral-level description or register-transfer level (RTL) description of the hardware functionality in a high-level design language (HDL) such as Verilog or VHDL. The description may be read by a synthesis tool which may synthesize the description to produce a netlist including a list of transistors/circuit elements from a synthesis library that represent the functionality of the hardware including the above-described functional blocks and circuit elements. The netlist may then be placed and routed to produce a data set describing geometric shapes to be applied to masks. The masks may then be used in various semiconductor fabrication steps to produce a semiconductor circuit or circuits (e.g., integrated circuits) corresponding to the above-described functional blocks and circuit elements. Alternatively, the database on the computer accessible storage medium may be the netlist (with or without the synthesis library) or the data set, as desired, or Graphic Data System (GDS) II data.

In this description, variables or unspecified values (i.e., general descriptions of values without particular instances of the values) are represented by letters such as N, M, and X As used herein, despite possibly using similar letters in different locations in this description, the variables and unspecified values in each case are not necessarily the same, i.e., there may be different variable amounts and values intended for some or all of the general variables and unspecified values. In other words, particular instances of N and any other letters used to represent variables and unspecified values in this description are not necessarily related to one another.

The expression "et cetera" or "etc." as used herein is intended to present an and/or case, i.e., the equivalent of "at least one of" the elements in a list with which the etc. is associated. For example, in the statement "the electronic device performs a first operation, a second operation, etc.," the electronic device performs at least one of the first operation, the second operation, and other operations. In addition, the elements in a list associated with an etc. are merely examples from among a set of examples—and at least some of the examples may not appear in some embodiments.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. An electronic device that handles accesses of a branch prediction functional block when executing instructions in program code, the electronic device comprising:
   a processor that includes:
      a branch prediction functional block configured to provide branch prediction information for control transfer instructions (CTIs); and
      a minimum predictor use (MPU) functional block, wherein the MPU functional block is configured to:
         determine, based on a record associated with a given fetch group of instructions, that a specified number of subsequent fetch groups of instructions that were previously determined to include no CTIs or conditional CTIs that were not taken are to be fetched for execution in sequence following the given fetch group; and
         when each of the specified number of the subsequent fetch groups is fetched and prepared for execution, prevent corresponding accesses of the branch prediction functional block for acquiring branch prediction information for instructions in that subsequent fetch group.

2. The electronic device of claim 1, wherein:
   the processor further includes:
      an execution unit functional block configured to execute instructions;
      a retire unit functional block configured to retire instructions that have completed execution in the execution unit functional block; and
      an MPU cache in the MPU functional block, the MPU cache including a plurality of entries; and
   the MPU functional block is further configured to:
      as instructions in subsequent fetch groups following each fetch group from among a set of fetch groups are retired by the retire unit functional block:
         keep a count of subsequent fetch groups for which all constituent instructions are retired before encountering the retirement of a taken conditional CTI, wherein subsequent fetch groups that include not taken conditional CTIs are included in the count; and
         store the count of the subsequent fetch groups in a record in an entry in the MPU cache associated with that fetch group.

3. The electronic device of claim 2, wherein the MPU functional block is further configured to:
   as instructions in subsequent fetch groups following each fetch group from among the set of fetch groups are retired by the retire unit functional block after a re-execution of the instructions in that fetch group and the instructions in the subsequent fetch groups that follows an earlier execution of the instructions in that fetch group and the instructions in the subsequent fetch groups:
      as conditional CTIs in the subsequent fetch groups are retired, determine whether outcomes of the conditional CTIs have changed from being not taken to being taken or from being taken to being not taken between the earlier execution and the re-execution; and
      when one or more changes has occurred in the outcomes of the conditional CTIs, update, in the record in the entry in the MPU cache associated with that fetch group, the count of the subsequent fetch groups based on the subsequent fetch group in which the changed conditional CTI is located.

4. The electronic device of claim 2, wherein the MPU functional block is further configured to:
   as instructions in subsequent fetch groups following each fetch group from among the set of fetch groups are retired by the retire unit functional block after a re-execution of the instructions in that fetch group and the instructions in the subsequent fetch groups that follows an earlier execution of the instructions in that fetch group and the instructions in the subsequent fetch groups:
      as conditional CTIs in the subsequent fetch groups are retired, determine whether outcomes of the conditional CTIs have changed from being not taken to being taken or from being taken to being not taken between the earlier execution and the re-execution;
      upon determining that no changes have occurred in the outcomes of the conditional CTIs between the earlier execution and the re-execution, increase a confidence value in the entry associated with that fetch group in the MPU cache;
      upon determining that at least one change has occurred in the outcomes of the conditional CTIs between the earlier execution and the re-execution, decrease a confidence value in the entry associated with that fetch group in the MPU cache; and
      prevent the corresponding accesses of the branch prediction functional block only when the confidence value is greater than a threshold value.

5. The electronic device of claim 2, wherein storing the count of the subsequent fetch groups in the record in the entry in the MPU cache associated with that fetch group includes:

determining whether the count of the subsequent fetch groups for that fetch group is greater than a threshold value; and storing the count in the record in the entry in the MPU cache only when the count is greater than the threshold value.

6. The electronic device of claim 2, wherein the MPU functional block is configured to:

determine that the count of the subsequent fetch groups for a particular fetch group is to be stored in a record in an entry in the MPU cache, but that all entries in the MPU cache are already in use;

select, based on a replacement policy, a selected entry from among the entries in the MPU cache to be overwritten; and overwrite the selected entry in the MPU cache with the count of the subsequent fetch groups for the particular fetch group.

7. The electronic device of claim 2, wherein, along with preventing the corresponding access of the branch prediction functional block when each of the specified number of the subsequent fetch groups is fetched and prepared for execution, the MPU functional block is configured to:

prevent a check of an entry in the MPU cache associated with that subsequent fetch group.

8. The electronic device of claim 1, wherein:

the processor further includes:

a front end configured to fetch and prepare fetch groups of instructions for execution, the front end including the branch prediction functional block; and an MPU cache in the MPU functional block, the MPU cache including N entries; and the MPU functional block is further configured to:

as instructions in subsequent fetch groups following each fetch group from among a set of fetch groups are prepared for execution in the front end:

keep a count of subsequent fetch groups for which the branch prediction functional block predicts all conditional CTIs to be not taken or that include no CTIs; and upon encountering a conditional CTI in a subsequent fetch group that is predicted to be taken by the branch prediction functional block, store the count of the subsequent fetch groups in a record in an entry in the MPU cache associated with that fetch group.

9. The electronic device of claim 1, wherein, when preventing the corresponding access of the branch prediction functional block when each of the specified number of the subsequent fetch groups is fetched and prepared for execution, the MPU functional block is configured to:

update one or more records in the branch prediction functional block with CTI activity information that would otherwise not have been added to the one or more records due to the prevented accesses of the branch prediction functional block.

10. The electronic device of claim 1, wherein, for preventing the corresponding access of the branch prediction functional block when each of the specified number of the subsequent fetch groups is fetched and prepared for execution, the MPU functional block is configured to:

set a branch access blocking counter to the specified number of the other fetch groups;

when the corresponding access of the branch prediction functional block is prevented for each other fetch group, decrement the branch access blocking counter; and after the branch access blocking counter reaches zero, as one or more subsequent fetch groups are fetched and prepared for execution, permit corresponding accesses of the branch prediction functional block to be performed to acquire branch prediction information for instructions in the one or more subsequent fetch groups.

11. The electronic device of claim 1, wherein the branch prediction functional block includes:

a branch target buffer (BTB); and a branch direction predictor;

wherein, when preventing the accesses of the branch prediction functional block, the MPU functional block prevents at least accesses of the BTB and the branch direction predictor.

12. The electronic device of claim 1, wherein the processor is configured to:

determine that a given conditional CTI in another fetch group was taken when the given conditional CTI in the other fetch group was executed after the corresponding access of the branch prediction functional block was prevented by the MPU functional block, thereby leading to the given conditional CTI being predicted to be not taken; and perform a branch recovery operation.

13. The electronic device of claim 1, wherein each fetch group includes multiple instructions that are fetched in a same fetching operation to be prepared for execution in the processor.

14. A method for handling accesses of a branch prediction functional block when executing instructions in program code in an electronic device having a processor that includes a branch prediction functional block that provides branch prediction information for control transfer instructions (CTIs) and a minimum predictor use (MPU) functional block, the method comprising:

determining, by the MPU functional block, based on a record associated with a given fetch group of instructions, that a specified number of subsequent fetch groups of instructions that were previously determined to include no CTIs or conditional CTIs that were not taken are to be fetched for execution in sequence following the given fetch group; and when each of the specified number of the subsequent fetch groups is fetched and prepared for execution, preventing, by the MPU functional block, corresponding accesses of the branch prediction functional block for acquiring branch prediction information for instructions in that subsequent fetch group.

15. The method of claim 14, wherein:

the processor further includes an execution unit functional block configured to execute instructions, a retire unit functional block configured to retire instructions that have completed execution in the execution unit functional block, and an MPU cache in the MPU functional block, the MPU cache including a plurality of entries; and the method further comprises:

as instructions in subsequent fetch groups following each fetch group from among a set of fetch groups are retired by the retire unit functional block:

keeping, by the retire unit functional block, a count of subsequent fetch groups for which all constituent instructions are retired before encountering the retirement of a taken conditional CTI, wherein subsequent fetch groups that include not taken conditional CTIs are included in the count; and storing, by the MPU functional block, the count of the subsequent fetch groups in a record in an entry in the MPU cache associated with that fetch group.

16. The method of claim 15, wherein the method further comprises:
as instructions in subsequent fetch groups following each fetch group from among the set of fetch groups are retired by the retire unit functional block after a re-execution of the instructions in that fetch group and the instructions in the subsequent fetch groups that follows an earlier execution of the instructions in that fetch group and the instructions in the subsequent fetch groups:
as conditional CTIs in the subsequent fetch groups are retired, determining, by the MPU functional block, whether outcomes of the conditional CTIs have changed from being not taken to being taken or from being taken to being not taken between the earlier execution and the re-execution; and
when one or more changes has occurred in the outcomes of the conditional CTIs, updating, by the MPU functional block, in the record in the entry in the MPU cache associated with that fetch group, the count of the subsequent fetch groups based on the subsequent fetch group in which the changed conditional CTI is located.

17. The method of claim 15, wherein the method further comprises:
as instructions in subsequent fetch groups following each fetch group from among the set of fetch groups are retired by the retire unit functional block after a re-execution of the instructions in that fetch group and the instructions in the subsequent fetch groups that follows an earlier execution of the instructions in that fetch group and the instructions in the subsequent fetch groups:
as conditional CTIs in the subsequent fetch groups are retired, determining, by the MPU functional block, whether outcomes of the conditional CTIs have changed from being not taken to being taken or from being taken to being not taken between the earlier execution and the re-execution;
upon determining that no changes have occurred in the outcomes of the conditional CTIs between the earlier execution and the re-execution, increasing, by the MPU functional block, a confidence value in the entry associated with that fetch group in the MPU cache;
upon determining that at least one change has occurred in the outcomes of the conditional CTIs between the earlier execution and the re-execution, decreasing, by the MPU functional block, a confidence value in the entry associated with that fetch group in the MPU cache; and
preventing, by the MPU functional block, the corresponding accesses of the branch prediction functional block only when the confidence value is greater than a threshold value.

18. The method of claim 15, wherein storing the count of the subsequent fetch groups in the record in the entry in the MPU cache associated with that fetch group includes:
determining, by the MPU functional block, whether the count of the subsequent fetch groups for that fetch group is greater than a threshold value; and
storing, by the MPU functional block, the count in the record in the entry in the MPU cache only when the count is greater than the threshold value.

19. The method of claim 15, wherein the method further comprises:
determining, by the MPU functional block, that the count of the subsequent fetch groups for a particular fetch group is to be stored in a record in an entry in the MPU cache, but that all entries in the MPU cache are already in use;
selecting, by the MPU functional block, based on a replacement policy, a selected entry from among the entries in the MPU cache to be overwritten; and
overwriting, by the MPU functional block, the selected entry in the MPU cache with the count of the subsequent fetch groups for the particular fetch group.

20. The method of claim 15, wherein the method further comprises:
along with preventing the corresponding access of the branch prediction functional block when each of the specified number of the subsequent fetch groups is fetched and prepared for execution, preventing, by the MPU functional block, a check of an entry in the MPU cache associated with that subsequent fetch group.

21. The method of claim 14, wherein:
the processor further includes a front end configured to fetch and prepare fetch groups of instructions for execution, the front end including the branch prediction functional block, and an MPU cache in the MPU functional block, the MPU cache including a plurality of entries; and
the method further comprises:
as instructions in subsequent fetch groups following each fetch group from among a set of fetch groups are prepared for execution in the front end:
keeping, by the MPU functional block, a count of subsequent fetch groups for which the branch prediction functional block predicts all conditional CTIs to be not taken or that include no CTIs; and
upon encountering a conditional CTI in a subsequent fetch group that is predicted to be taken by the branch prediction functional block, storing, by the MPU functional block, the count of the subsequent fetch groups in a record in an entry in the MPU cache associated with that fetch group.

22. The method of claim 14, wherein the method further comprises:
when preventing the corresponding access of the branch prediction functional block when each of the specified number of the subsequent fetch groups is fetched and prepared for execution, updating, by the MPU functional block, one or more records in the branch prediction functional block with CTI activity information that would otherwise not have been added to the one or more records due to the prevented accesses of the branch prediction functional block.

23. The method of claim 14, wherein the method further comprises:
when preventing the corresponding access of the branch prediction functional block when each of the specified number of the subsequent fetch groups is fetched and prepared for execution:
setting, by the MPU functional block, a branch access blocking counter to the specified number of the other fetch groups;
when the corresponding access of the branch prediction functional block is prevented for each other fetch group, decrementing, by the MPU functional block, the branch access blocking counter; and after the branch access blocking counter reaches zero, as one or more subsequent fetch groups are fetched and prepared for execution, permitting, by the MPU functional block, corresponding accesses of the branch prediction functional block to be performed to acquire branch prediction information for instructions in the one or more subsequent fetch groups.

24. The method of claim 14, wherein:

the branch prediction functional block includes a branch target buffer (BTB) and a branch direction predictor; and preventing the accesses of the branch prediction functional block includes preventing, by the MPU functional block, at least accesses of the BTB and the branch direction predictor.

25. The method of claim 14, wherein the method further comprises:

determining, by the processor, that a given conditional CTI in another fetch group was taken when the given conditional CTI in the other fetch group was executed after the corresponding access of the branch prediction functional block was prevented by the MPU functional block, thereby leading to the given conditional CTI being predicted to be not taken; and performing, by the processor, a branch recovery operation.

26. The method of claim 14, wherein each fetch group includes multiple instructions that are fetched in a same fetching operation to be prepared for execution in the processor.

* * * * *